(12) United States Patent
Wang et al.

(10) Patent No.: US 7,505,982 B2
(45) Date of Patent: Mar. 17, 2009

(54) LOCAL METADATA EMBEDDING SOLUTION

(75) Inventors: Jian Wang, Beijing (CN); Jiang Wu, San Jose, CA (US); Chunhui Zhang, Beijing (CN); Yingnong Dang, Beijing (CN); Qiang Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 11/121,442

(22) Filed: May 4, 2005

(65) Prior Publication Data

US 2006/0123049 A1 Jun. 8, 2006

Related U.S. Application Data

(60) Provisional application No. 60/632,647, filed on Dec. 3, 2004.

(51) Int. Cl.
*G06F 17/30* (2006.01)
*G06F 7/00* (2006.01)

(52) U.S. Cl. .................... 707/100; 707/102; 707/104.1; 382/188

(58) Field of Classification Search .................. None
See application file for complete search history.

(56) References Cited

U.S. PATENT DOCUMENTS

| | | | |
|---|---|---|---|
| 5,051,736 A | 9/1991 | Bennett et al. | |
| 6,330,976 B1 | 12/2001 | Dymetman et al. | |
| 6,671,386 B1 | 12/2003 | Shimizu et al. | |
| 6,964,483 B2 | 11/2005 | Wang et al. | |
| 7,009,594 B2 | 3/2006 | Wang et al. | |
| 7,024,429 B2 * | 4/2006 | Ngo et al. | 707/201 |
| 7,036,938 B2 | 5/2006 | Wang et al. | |
| 7,116,840 B2 | 10/2006 | Wang et al. | |
| 7,133,563 B2 | 11/2006 | Wang et al. | |
| 7,136,054 B2 | 11/2006 | Wang et al. | |
| 7,263,224 B2 | 8/2007 | Wang et al. | |
| 7,330,605 B2 | 2/2008 | Wang et al. | |
| 7,386,191 B2 | 6/2008 | Wang et al. | |
| 7,400,777 B2 | 7/2008 | Wang et al. | |
| 7,421,439 B2 | 9/2008 | Wang et al. | |
| 2002/0048404 A1 | 4/2002 | Fahraeus et al. | |
| 2002/0050982 A1 | 5/2002 | Ericson | |

(Continued)

OTHER PUBLICATIONS

U.S. Appl. No. 11/066,800, Wang.

(Continued)

*Primary Examiner*—Baoquoc N To
(74) *Attorney, Agent, or Firm*—Perkins Coie LLP

(57) ABSTRACT

In accordance with embodiments of the invention, local metadata is embedded into, and extracted from, an embedded interaction code document. A plurality of local-metadata values are assigned, in accordance with a set of local-metadata conflict-resolution rules, via a plurality of respective partial-share channels, to a plurality of respective local-metadata fields. The local metadata is decoded by decoding the partial-share channels and by resolving potentially conflicting decoded local-metadata values according to the set of local-metadata conflict-resolution rules. A local metadata value of a region to the left may be smaller than a local metadata value of a potentially conflicting region to the right, and the values may be non-continuous. A local metadata value of an upper region may be smaller than a local metadata value of a potentially conflicting lower region, and the values may be continuous.

6 Claims, 25 Drawing Sheets

U.S. PATENT DOCUMENTS

| | | |
|---|---|---|
| 2003/0030638 A1 | 2/2003 | Astrom et al. |
| 2004/0212553 A1 | 10/2004 | Wang |
| 2005/0044164 A1* | 2/2005 | O'Farrell et al. ............ 709/213 |
| 2005/0193292 A1 | 9/2005 | Lin et al. |
| 2006/0109263 A1 | 5/2006 | Wang et al. |
| 2006/0182309 A1 | 8/2006 | Wang et al. |
| 2006/0182343 A1 | 8/2006 | Lin et al. |
| 2006/0190818 A1 | 8/2006 | Wang et al. |
| 2006/0204101 A1 | 9/2006 | Wang et al. |
| 2006/0215913 A1 | 9/2006 | Wang |
| 2006/0242560 A1 | 10/2006 | Wang et al. |
| 2006/0242562 A1 | 10/2006 | Wang et al. |
| 2006/0242622 A1 | 10/2006 | Wang et al. |
| 2006/0274948 A1 | 12/2006 | Wang et al. |
| 2007/0001950 A1 | 1/2007 | Zhang et al. |
| 2007/0003150 A1 | 1/2007 | Xu et al. |
| 2007/0041654 A1 | 2/2007 | Wang et al. |
| 2007/0042165 A1 | 2/2007 | Wang et al. |
| 2008/0025612 A1 | 1/2008 | Wang et al. |

OTHER PUBLICATIONS

U.S. Appl. No. 11/067,193, Yang.
U.S. Appl. No. 11/142,844, Wang.
U.S. Appl. No. 12/131,810, Wang.
U.S. Appl. No. 12/138,339, Wang.
U.S. Appl. No. 12/180,484, Wang.

* cited by examiner

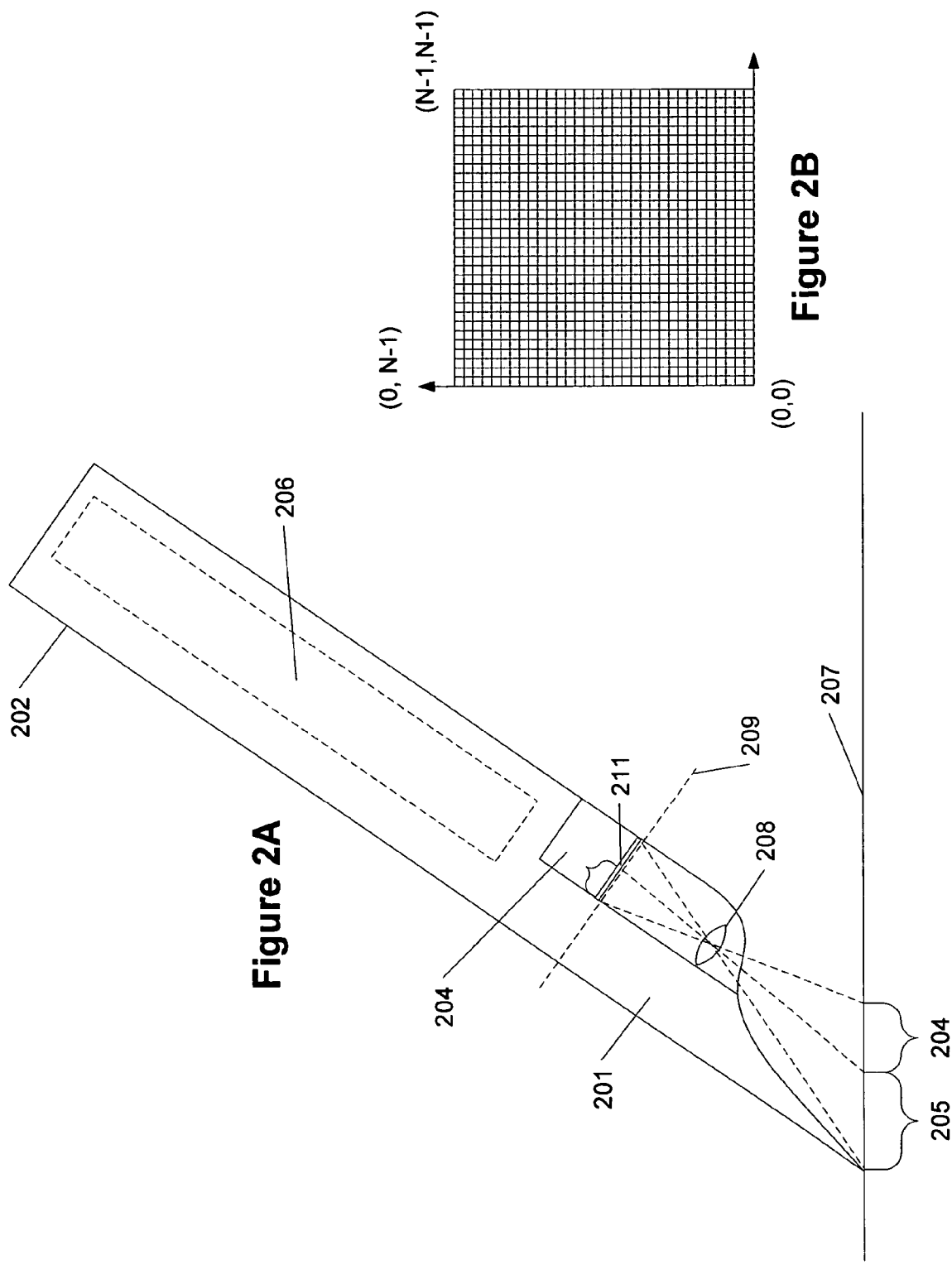

Figure 3A  0111 0000 0101 1101 1001 0111 1111 1000 1010
Figure 3B  0101 0111 0 1101 1001 0 001010011 111101100
Figure 3C  0101 1101 0011 1101 1001 1001 1110 0010
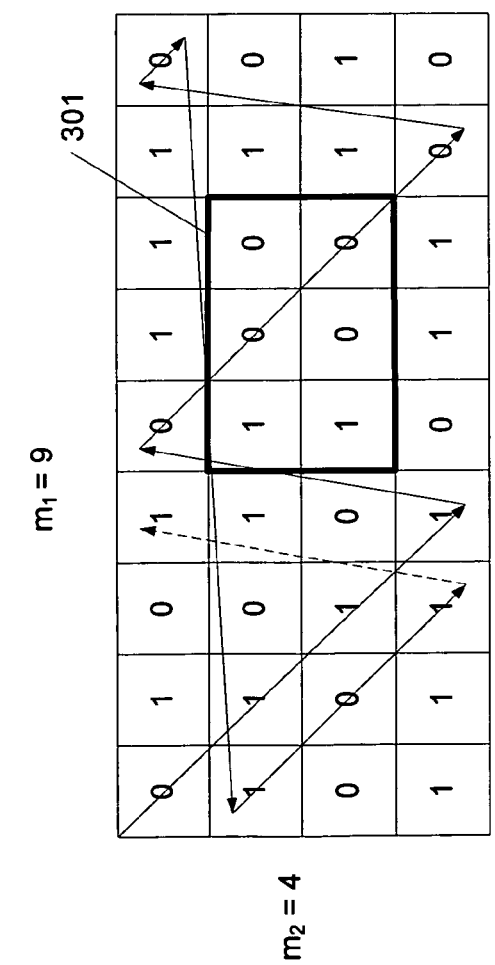
Figure 3D
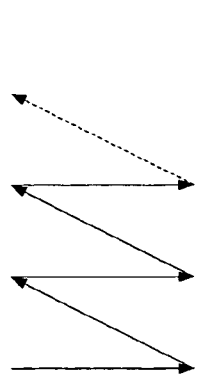
Figure 3E
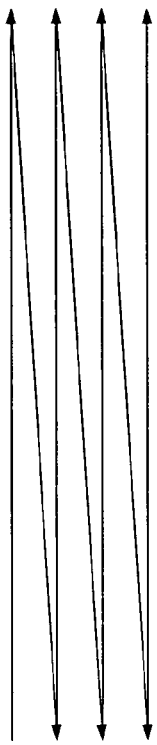
Figure 3F

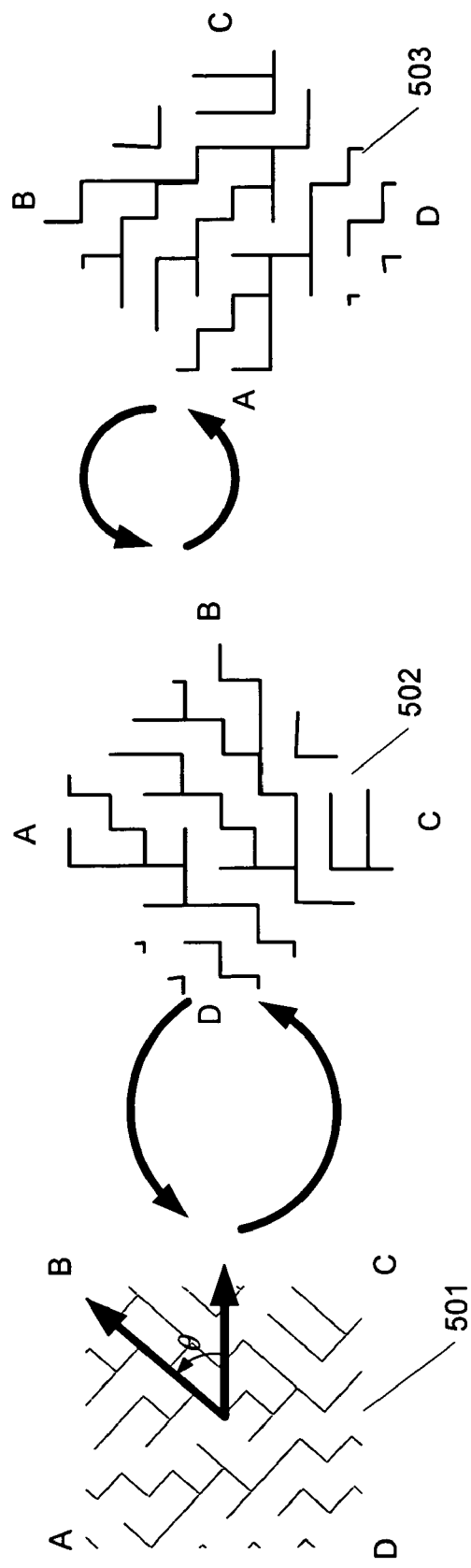

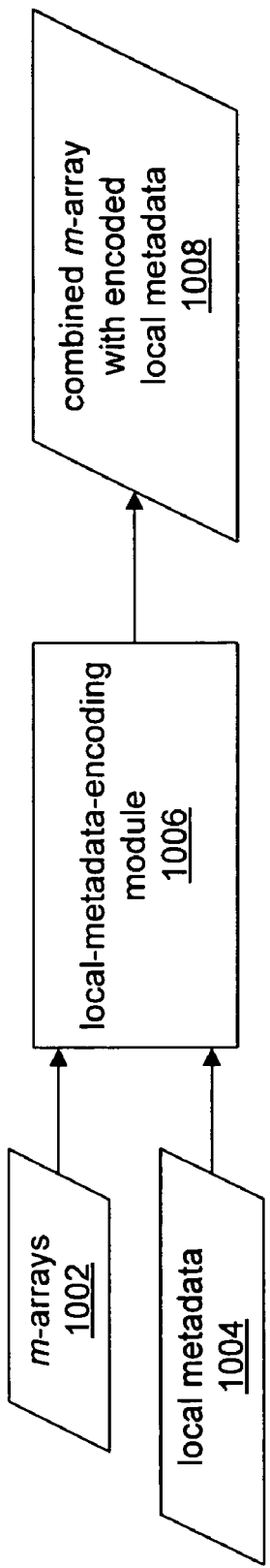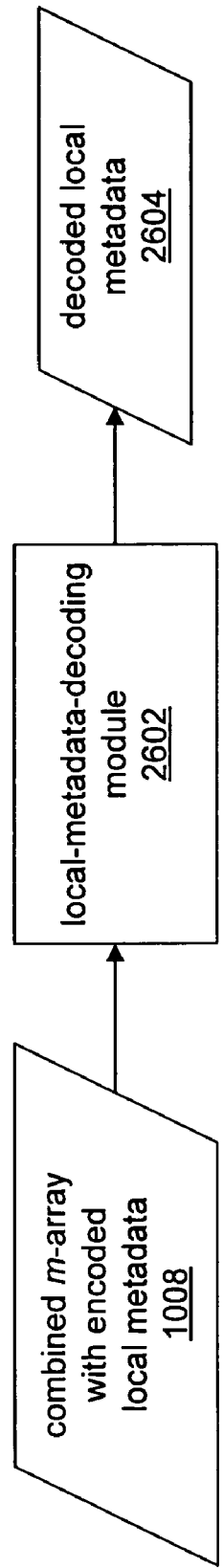
Figure 10
Figure 26

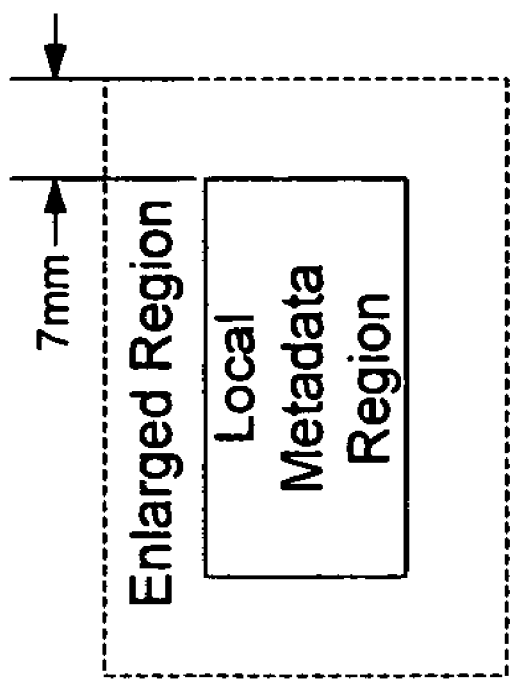
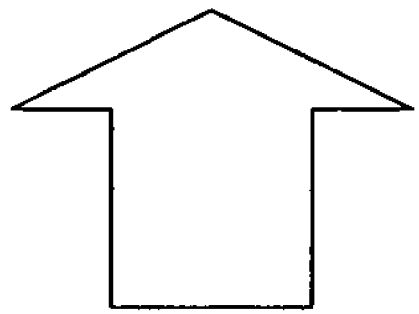
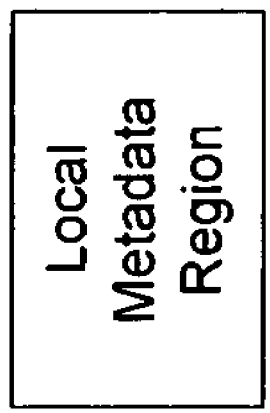
Figure 11

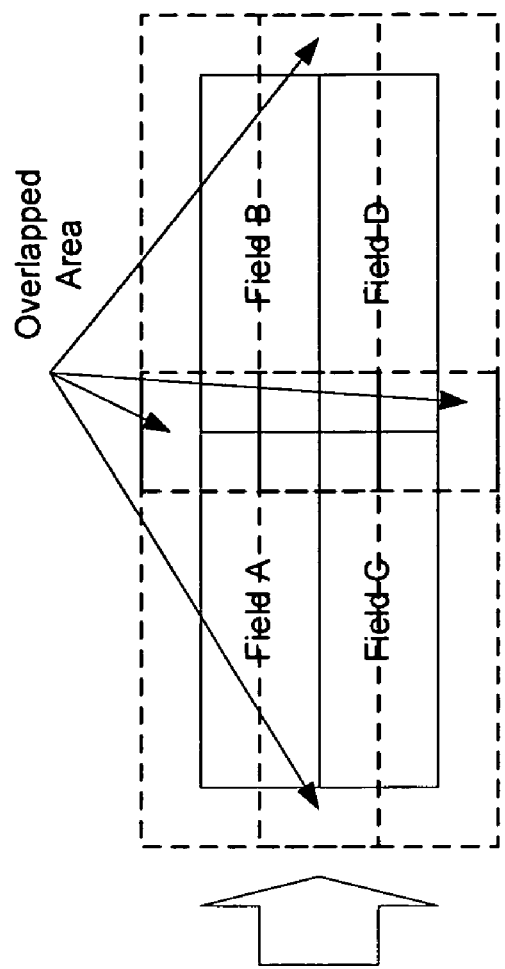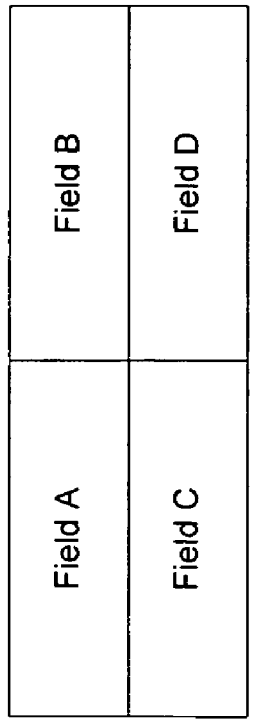
Figure 12

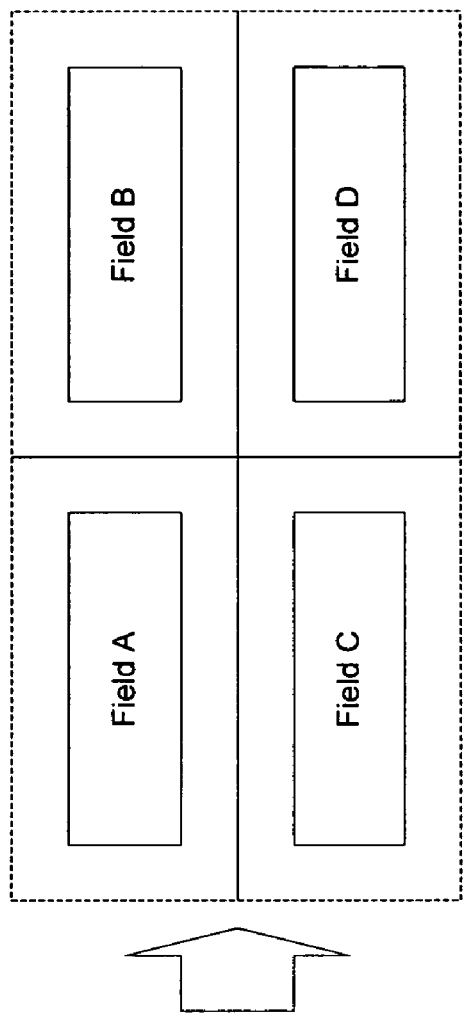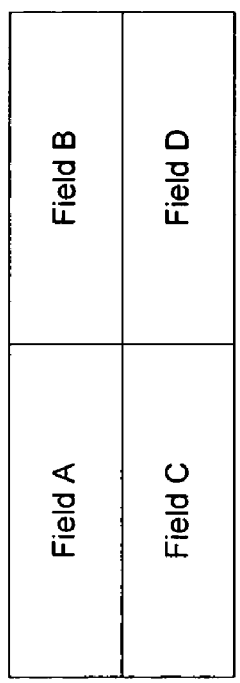
Figure 13

LOCAL METADATA EMBEDDING SOLUTION

This application claims priority to provisional U.S. application Ser. No. 60/632,647, which was filed Dec. 3, 2004 and which is incorporated herein by reference.

TECHNICAL FIELD

Embodiments of the invention relate to interacting with a medium using a digital pen. More particularly, embodiments of the invention relate to determining the location of a digital pen during interaction with one or more surfaces.

BACKGROUND OF THE INVENTION

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

Users are accustomed to writing on both blank paper and paper with preexisting content. For annotations from each of these surfaces to be represented electronically, one needs to determine the location of the pen for these different environments.

Digital pens that use cameras to determine their location typically capture a block of integrated information to retrieve the position of the pen relative to a positionally encoded medium or any other information embedded in the positionally encoded medium. Here, camera-captured images may or may not contain an image of the pen tip.

Therefore, when local metadata, which is associated with a particular region of the positionally encoded medium, is introduced, the problem becomes more difficult to address. FIG. 11 shows a local metadata region and enlarged region. As FIG. 11 shows, when assigning local metadata to a region, in some cases, the region is enlarged and local metadata is embedded into it, so that one can retrieve the local metadata when writing in the original region and holding a digital pen in any pose (i.e., independent of pen rotation and angle). A typical margin size is 7 mm.

FIG. 12 shows a form with some conterminous fields. FIG. 12 shows an example of a potential conflict associated with a conventional local-metadata-embedding method. The overlapped area shows conflicts caused by two local metadata values being embedded in the same area.

Some solutions for trying to resolve the conflicts associated with conterminous local-metadata regions, as FIG. 13 shows, are based on avoiding conterminous fields, which means all fields with local metadata should be separated. Therefore, the available design layout options are limited when creating forms and large amounts of space get wasted. This kind of solution is not efficient.

FIG. 13 shows fields that are separated to avoid local metadata conflict.

SUMMARY OF THE INVENTION

Aspects of the invention provide solutions to at least one of the issues mentioned above, thereby enabling location of a position or positions on a surface. Other aspects permit the storage and decoding of metadata. This reduces the space limitation of a document or form thereby allowing greater information storage.

In accordance with embodiments of the invention, local metadata is embedded into, and extracted from, an embedded interaction code document. A plurality of local-metadata values are assigned, in accordance with a set of local-metadata conflict-resolution rules, via a plurality of respective partial-share channels, to a plurality of respective local-metadata fields. The local metadata is decoded by decoding the partial-share channels and by resolving potentially conflicting decoded local-metadata values according to the set of local-metadata conflict-resolution rules. A local metadata value of a region to the left may be smaller than a local metadata value of a potentially conflicting region to the right, and the values may be non-continuous. A local metadata value of an upper region may be smaller than a local metadata value of a potentially conflicting lower region, and the values may be continuous.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation, with regard to the claimed invention.

FIGS. 2A and 2B show an image capture system and corresponding captured image in accordance with embodiments of the present invention.

FIGS. 3A through 3F show various sequences and folding techniques for encoding information in accordance with embodiments of the present invention.

FIG. 5 shows rotation of a captured image portion in accordance with embodiments of the present invention.

FIG. 6 shows various angles of rotation used in conjunction with the coding system of FIGS. 4A through 4E.

FIG. 10 shows a flow diagram of a system for encoding local metadata in accordance with embodiments of the invention.

FIGS. 11-13 show techniques for storing metadata.

FIG. 26 shows a flow diagram of a system for decoding local metadata in accordance with embodiments of the invention.

DETAILED DESCRIPTION OF THE INVENTION

Aspects of the invention relate to determining the location of a captured image in relation to a larger image. Aspects of the invention relate to minimizing the number of image sets that need to be searched. This reduction in search size improves the speed with which the path of a pen may be determined. The location determination techniques described herein may be used in combination with a multi-function pen.

Additional aspects of the invention relate to storing and decoding metadata information.

The following discussion is separated by subheadings for the benefit of the reader. The subheadings include: terms, general-purpose computer, image capturing pen, active codes, passive codes, path determinations, code grouping, path determination, and metadata solutions.

and, unless specified otherwise, may be direct or indirect and that this specification is not intended to be limiting in this respect.

Terms

Pen—any writing implement that may or may not include the ability to store ink. In some examples, a stylus with no ink capability may be used as a pen in accordance with embodiments of the present invention.

Camera—an image capture system that may capture an image from paper, a computer display, or any other medium.

General Purpose Computer

Figure 1:
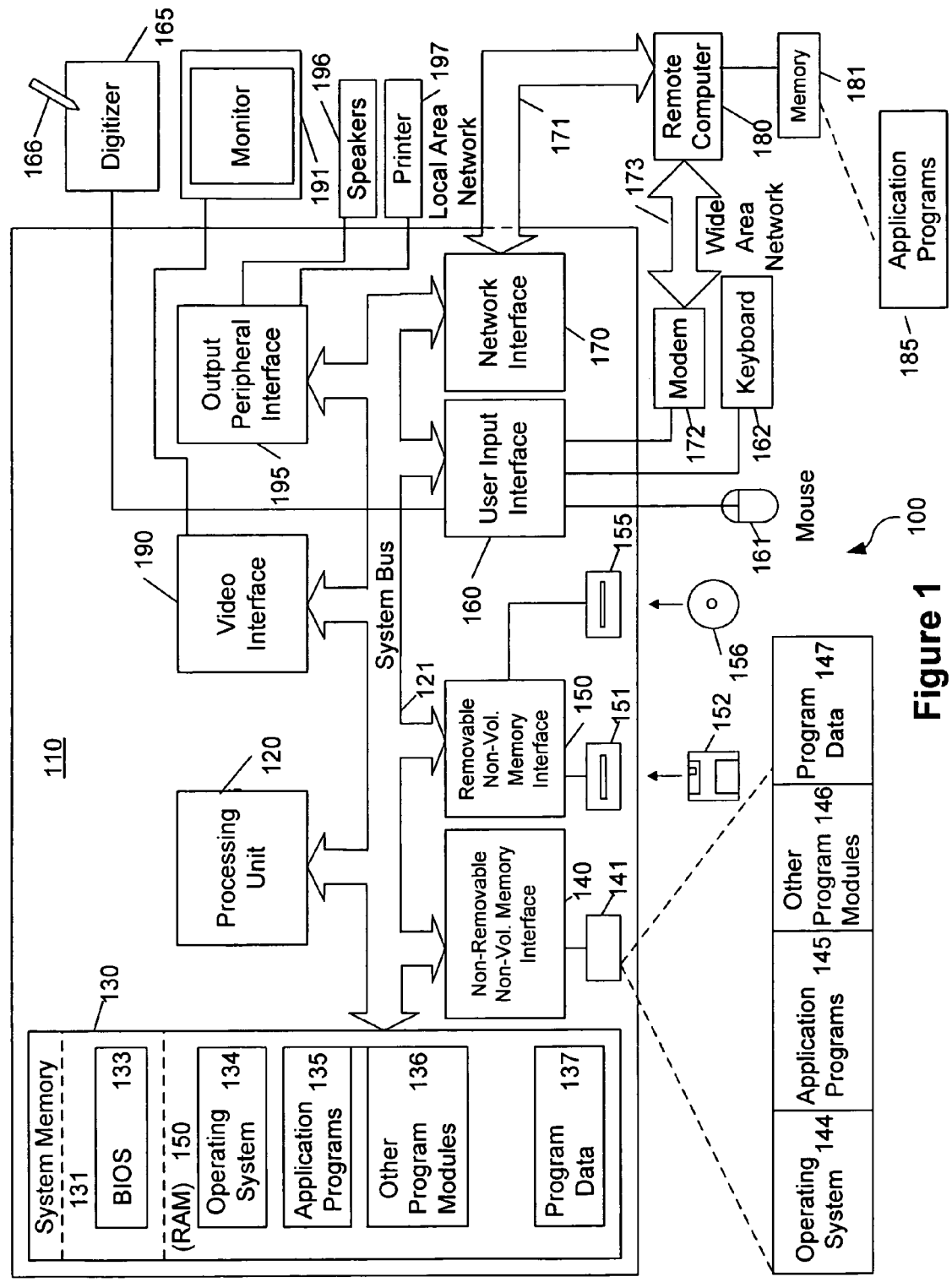
FIG. 1 shows a general description of a computer that may be used in conjunction with embodiments of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form. The displayed form may be printed paper (or other physical medium) or may be a display projecting the encoded data stream in conjunction with another image or set of images. For example, the encoded data stream may be represented as a physical encoded image on the paper or an encoded image overlying the displayed image or may be a physical encoded image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing the location of the camera, the system can track movement of the stylus being controlled by the user.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 is 32×32 pixels (where N=32). Accordingly, FIG. 2B shows a field of view of 32 pixels long by 32 pixels wide. The size of N is adjustable based on the degree of image resolution desired. Also, while the field of view of the camera 203 is shown as a square for illustrative purposes here, the field of view may include other shapes as is known in the art.

The input to the pen 201 from the camera 203 may be defined as a sequence of image frames {Ii}, i=1, 2, . . . , A, where Ii is captured by the pen 201 at sampling time ti. The selection of sampling rate is due to the maximum motion frequency of pen tip, which may be the same as the frequency of the hand when one writes. The frequency is known as to be from 0 up to 20 Hz. By the Nyquist-Shannon sampling theorem, the minimum sampling rate should be 40 Hz, typically 100 Hz. In one example, the sampling rate is 110 Hz. The size of the captured image frame may be large or small, depending on the size of the document and the degree of exactness required. Also, the camera image size may be determined based on the size of the document to be searched.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211. Because the transformation from the location of the virtual pen tip 212 (represented by $L_{virtual-pentip}$) to the location of the real pen tip 202 (represented by $L_{pentip}$), one can determine the location of the real pen tip in relation to a captured image 210.

The following transformation $F_{S \to P}$ transforms the image captured by camera to the real image on the paper:

$$L_{paper} = F_{S \to P}(L_{Sensor})$$

During writing, the pen tip and the paper are on the same plane. Accordingly, the transformation from the virtual pen tip to the real pen tip is also $F_{S \to P}$:

$$L_{pentip} = F_{S \to P}(L_{virtual-pentip})$$

The transformation $F_{S \to P}$ may be referred to as a perspective transformation. This simplifies as:

$$F'_{S \to P} = \begin{Bmatrix} s_x \cos\theta, & s_y \sin\theta, & 0 \\ -s_x \sin\theta, & s_y \cos\theta, & 0 \\ 0, & 0, & 1 \end{Bmatrix}$$

as the estimation of $F_{S \to P}$, in which $\theta$, $s_x$, and $s_y$ are the rotation and scale of two orientations of the pattern captured at location 204. Further, one can refine $F'_{S \to P}$ to $F_{S \to P}$ by matching the captured image with the corresponding background image on paper. "Refine" means to get a more precise perspective matrix $F_{S \to P}$ (8 parameters) by a kind of optimization algorithm referred to as a recursive method. The recursive method treats the matrix $F'_{S \to P}$ as the initial value. $F_{S \to P}$ describes the transformation between S and P more precisely than $F'_{S \to P}$.

Next, one can determine the location of virtual pen tip by calibration.

One places the pen tip 202 on a known location $L_{pentip}$ on paper. Next, one tilts the pen, allowing the camera 203 to capture a series of images with different pen poses. For each image captured, one may receive the transform $F_{S \to P}$. From this transform, one can obtain the location of the virtual image of pen tip $L_{virtual-pentip}$:

$$L_{virtual-pentip} = F_{P \to S}(L_{pentip})$$

And, $$F_{P \to S} = 1/F_{S \to P}$$

By averaging the $L_{virtual-pentip}$ received from every image, an accurate location of the virtual pen tip $L_{virtual-pentip}$ may be determined.

The location of the virtual pen tip $L_{virtual-pentip}$ is now known. One can also obtain the transformation $F_{S \to P}$ from image captured. Finally, one can use this information to determine the location of the real pen tip $L_{pentip}$:

$$L_{pentip} = F_{S \to P}(L_{virtual-pentip})$$

Active Codes

One may insert information into a document (or added as an image or on the display of a computer) to aid in determination of a pen's location. The information may be a two-dimensional array in which each sub-array of a given size is unique.

A two-dimensional array may be constructed by folding a one-dimensional sequence. Any portion of the two-dimensional array may be used to determine its location in complete two-dimensional array. One concern is that the image portion captured by a camera is limited in size. Accordingly, one needs to be able to determine the location from the captured image or a few captured images. Additional complications arise in that errors present in the captured image may compromise the availability of some points in the captured image. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$ where $n \geq 1$ and where p is a prime number. The sequence or m-sequence may be generated by a variety of different techniques including, but not limited to, polynomial division. Using polynomial division, the sequence may be defined as follows:

$$\frac{R_l(x)}{P_n(x)}$$

where $P_n(x)$ is a primitive polynomial of degree n in field $F_q[x]$ (having q elements). $R_l(x)$ is a nonzero polynomial of degree l (where l<n) in field $F_q[x]$. The sequence may be created used an iterative procedure using two steps: first, dividing the two polynomials (resulting in an element of field Fq) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, over a width (or length) n, any portion exists once in the sequence.

The process described above is but one of a variety of processes that may be used to create a non-repeating sequence.

Array Construction

The array (or m-array) that may be used to create the image (of which a portion may be captured by the camera) is an extension of the one-dimensional sequence or m-sequence. Let A be an array of period $(m_1, m_2)$, namely $A(k+m_1, l) = A(k, l+m_2) = A(k, l)$. When an $n_1 \times n_2$ window shifts through a period of A, all the nonzero $n_1 \times n_2$ matrices over $F_q$ appear once and only once. This property may be referred to as a "window property" in that each window is unique. A may then be expressed as an array of period (m1, m2) (with $m_1$ and $m_2$ being the horizontal and vertical number of bits present in the array) and order (n1, n2).

A binary array (or m-array) may be constructed by folding the sequence. One approach is to obtain a sequence then fold it to a size $m_1 \times m_2$ where the length of the array is $L = m_1 \times m_2 = 2^n - 1$. Alternatively, one may start with a predetermined size of the space one wants to cover (for example, one sheet of paper, 30 sheets of paper or the size of a computer monitor), determine the area $(m_1 \times m_2)$, then use the size to let and $L \geq m_1 m_2$, where $L = 2^n - 1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths FIGS. 3E and 3F. The folding method as shown in FIG. 3D may be expressed as when $gcd(m_1, m_2) = 1$ where $L = 2^n - 1$.

To create the folding method as shown in FIG. 3D, one creates a sequence $\{a_i\}$ of length L and order n. Next, an array $\{b_{kl}\}$ of size $m_1 \times m_2$ is created from the sequence $\{a_i\}$ by letting each bit of the array be calculated as shown by equation 2:

$$b_{kl} = a_i \qquad (2)$$

where, $k = i \bmod(m_1)$, $l = i \bmod(m_2)$, $i = 0, \ldots L-1$.

This folding approach may be alternatively expressed as laying the sequence on the diagonal of the array, then continuing from the opposite side when an edge is reached.

Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

Figure 4A:
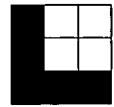
FIGS. 4A through 4D show four possible resultant corners associated with the encoding system according to FIGS. 4A and 4B.
Figure 4B:
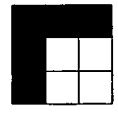
Figure 4C:
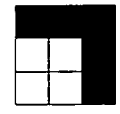
Figure 4D:
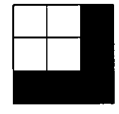

For the determination of the orientation of the captured image relative to the whole encoded area, one may notice that not all the four conceivable corners shown in FIG. 4A-4D can present in the graphical pattern 403. In fact, with the correct orientation, the type of corner shown in FIG. 4A cannot exist in the graphical pattern 403. Therefore, the orientation in which the type of corner shown in FIG. 4A is missing is the right orientation.

Continuing to FIG. 5, the camera-captured image 501 may be analyzed and its orientation determined so as to be interpretable as to the position actually represented by the image 501. First, image 501 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 501 is analyzed to determine which corner is missing. The rotation amount o needed to rotate image 501 to an image ready for decoding 503 is shown as o=(θ plus a rotation amount {defined by which corner missing}). The rotation amount is shown by the equation in FIG. 6. Referring back to FIG. 5, angle θ is first determined by the layout of the pixels to arrive at a horizontal and vertical (or other predefined grid orientation) arrangement of the pixels and the image is rotated as shown in 502. An analysis is then conducted to determine the missing corner and the image 502 rotated to the image 503 to set up the image for decoding. Here, the image is rotated 90 degrees counterclockwise so that image 603 has the correct orientation and can be used for decoding.

It is appreciated that the rotation angle θ may be applied before or after rotation of the image 501 to account for the missing corner. It is also appreciated that by considering noise in the captured image, all four types of corners may be present. We may count the number of corners of each type and choose the type that has the least number as the corner type that is missing.

Finally, the code in image 503 is read out and correlated with the original bit stream used to create the image. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

As will be discussed, maze pattern analysis obtains recovered bits from image 503. Once one has the recovered bits, one needs to locate the captured image within the original array. The process of determining the location of a segment of bits within the entire array is complicated by a number of items. First, the actual bits to be captured may be obscured (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0 \, b_1 \, b_2 \ldots b_{K-1})^t$, where $K \geq n$ and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T^s(I)$, where T is the cyclic shift operator. We find this s indirectly. The polynomials modulo $P_n(x)$ form a field. It is guaranteed that $x^s \equiv r_0 + r_1 x + \ldots r_{n-1} x^{n-1} \mod(P_n(x))$. Therefore, we may find $(r_0, r_1, \ldots, r_{n-1})$ and then solve for s.

The relationship $x^s \equiv r_0 + r_1 x + \ldots r_{n-1} x^{n-1} \mod(P_n(x))$ implies that $R = r_0 + r_1 T(I) + \ldots + r_{n-1} T^{n-1}(I)$. Written in a binary linear equation, it becomes:

$$R = r^t A, \quad (2)$$

where $r=(r_0 \, r_1 \, r_2 \ldots r_{n-1})^t$, and $A=(I \, T(I) \ldots T^{n-1}(I))^t$ which consists of the cyclic shifts of I from 0-shift to (n−1)-shift. Now only sparse K bits are available in R to solve r. Let the index differences between $b_i$ and $b_0$ in R be $k_i$, $i=1, 2, \ldots, k-1$, then the $1^{st}$ and $(k_i+1)$-th elements of R, $i=1, 2, \ldots, k-1$, are exactly $b_0, b_1, \ldots, b_{k-1}$. By selecting the $1^{st}$ and $(k_i+1)$-th columns of A, $i=1, 2, \ldots k-1$, the following binary linear equation is formed:

$$b^t = r^t M, \quad (3)$$

where M is an n×K sub-matrix of A.

If b is error-free, the solution of r may be expressed as:

$$r^t = \tilde{b}^t \tilde{M}^{-1} \quad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logorithms," IEEE Transactions on Computers 43.5 (May 1994, pp 560-568) to find s so that $x^s \equiv r_0 + r_1 x + \ldots r_{n-1} x^{n-1} \mod (P_n(x))$.

As matrix A (with the size of n by L, where $L=2^n-1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to saved. The total number of such columns is much smaller than L (where $L=2^n-1$ is the length of the m-sequence).

Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing correct n bits from the K bits of b and the corresponding sub-matrix $\tilde{M}$ of M being non-degenerate is high.

When the n bits chosen are all correct, the Hamming distance between $b^t$ and $r^t M$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 7:
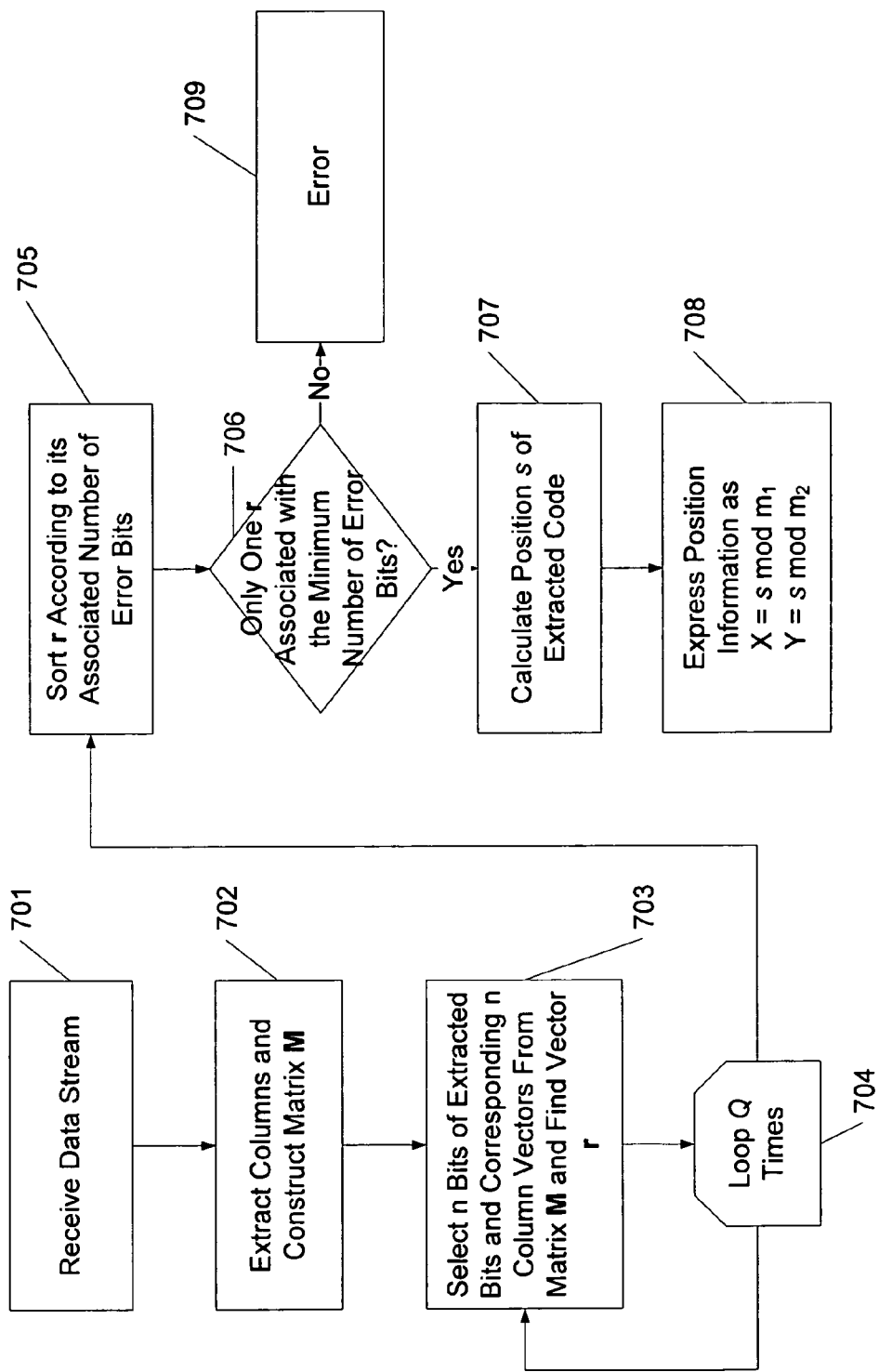
FIG. 7 shows a process for determining the location of a captured array in accordance with embodiments of the present invention.

FIG. 7 depicts a process that may be used to determine a location in a sequence (or m-sequence) of a captured image. First, in step 701, a data stream relating to a captured image is received. In step 702, corresponding columns are extracted from A and a matrix M is constructed.

In step 703, n independent column vectors are randomly selected from the matrix M and vector r is determined by solving equation (4). This process is performed Q times (for example, 100 times) in step 704. The determination of the number of loop times is discussed in the section Loop Times Calculation.

In step 705, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 706 whether error correction was performed successfully, by checking whether multiple r's are associated with the minimum number of error bits. If yes, an error is returned in step 709, indicating the decoding process failed. If not, the position s of the extracted bits in the sequence (or m-sequence) is calculated in step 707, for example, by using the Pohig-Hellman-Silver algorithm.

Next, the (X,Y) position in the array is calculated as: $x=s \bmod m_1$ and $y=s \bmod m_2$ and the results are returned in step 708.

Location Determination

Figure 8:
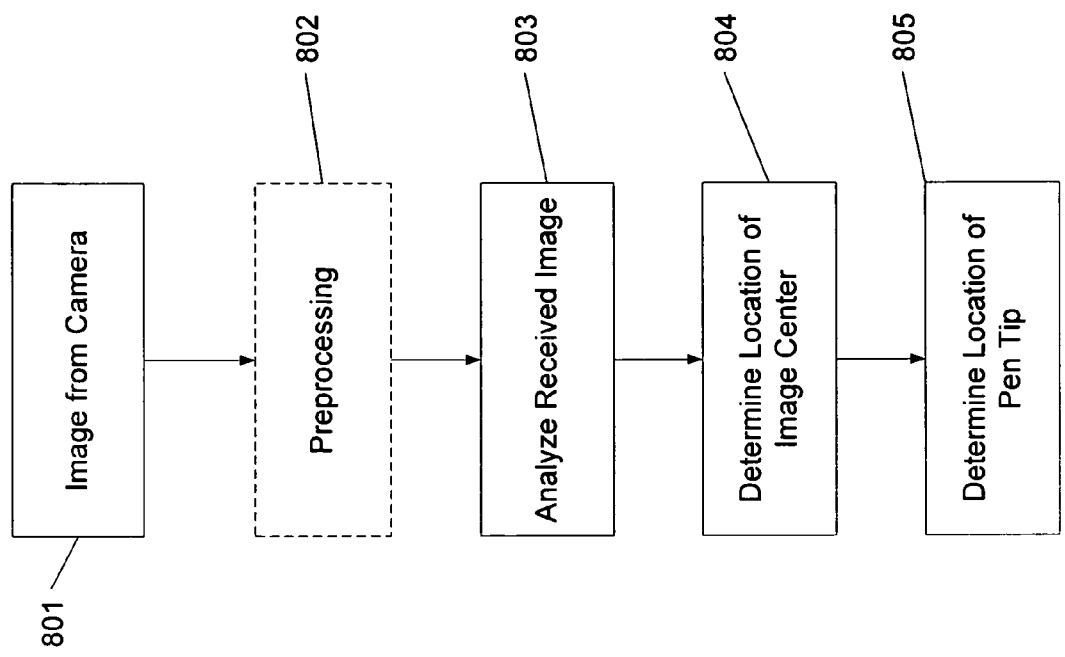
FIG. 8 shows a method for determining the location of a captured image in accordance with embodiments of the present invention.

FIG. 8 shows a process for determining the location of a pen tip. The input is an image captured by a camera and the output may be position coordinates of the pen tip. Also, the output may include (or not) other information such as a rotation angle of the captured image.

In step 801, an image is received from a camera. Next, the received image may be optionally preprocessed in step 802 (as shown by the broken outline of step 802) to adjust the contrast between the light and dark pixels and the like.

Next, in step 803, the image is analyzed to determine the bit stream within it.

Next, in step 804, n bits are randomly selected from the bit stream for multiple times and the location of the received bit stream within the original sequence (or m-sequence) is determined.

Finally, once the location of the captured image is determined in step 804, the location of the pen tip may be determined in step 805.

Figure 9:
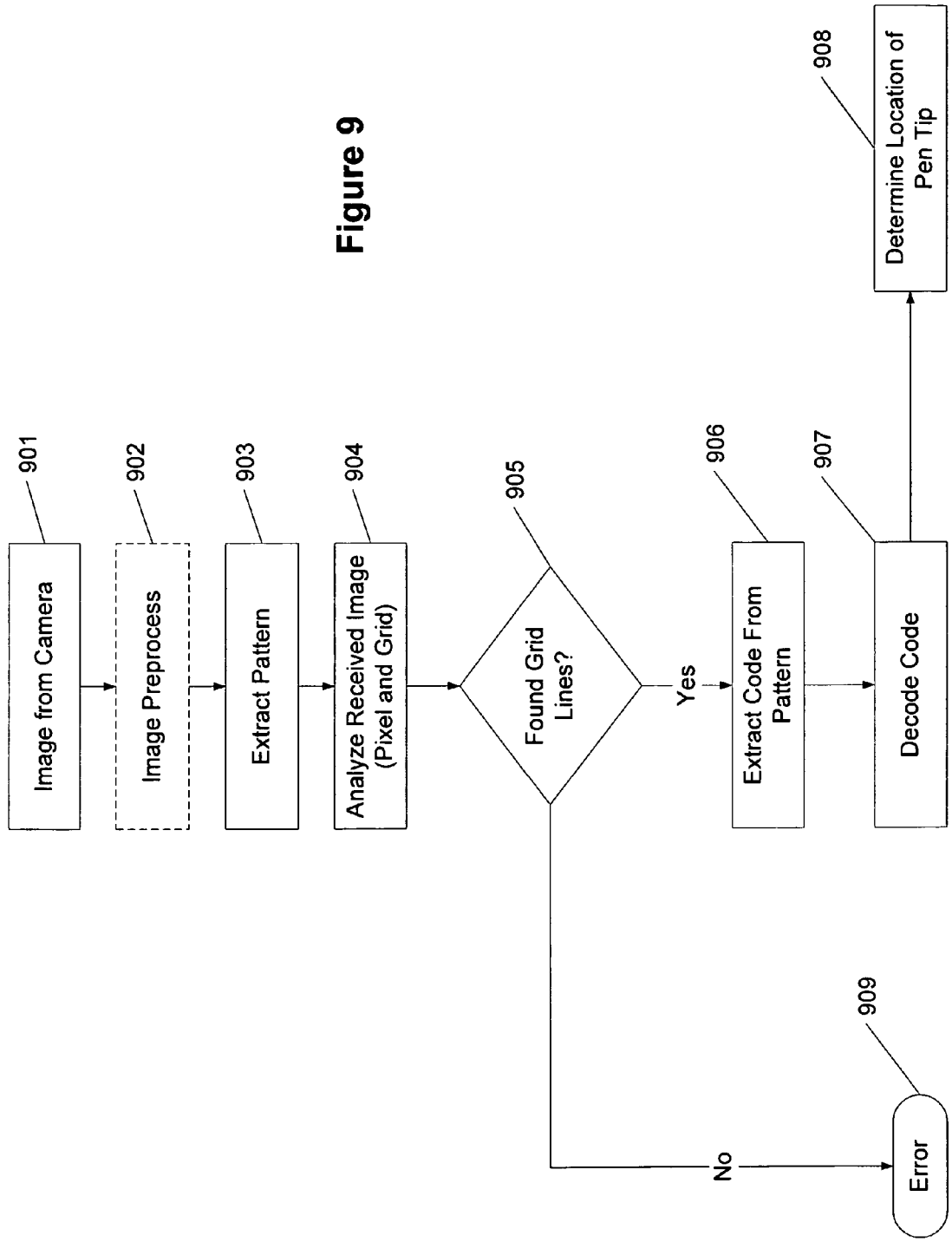
FIG. 9 shows another method for determining the location of captured image in accordance with embodiments of the present invention.

FIG. 9 gives more details about 803 and 804 and shows the approach to extract the bit stream within a captured image. First, an image is received from the camera in step 901. The image then may optionally undergo image preprocessing in step 902 (as shown by the broken outline of step 902). The pattern is extracted in step 903. Here, pixels on the various lines may be extracted to find the orientation of the pattern and the angle θ.

Next, the received image is analyzed in step 904 to determine the underlying grid lines. If grid lines are found in step 905, then the code is extracted from the pattern in step 906. The code is then decoded in step 907 and the location of the pen tip is determined in step 908. If no grid lines were found in step 905, then an error is returned in step 909.

Local Metadata Encoding

FIG. 10 shows a flow diagram of a system for encoding local metadata in accordance with embodiments of the invention. One or more m-arrays, as depicted by m-arrays 1002, and local metadata 1004 are input to a local-metadata-encoding module 1006, which outputs a combined array with encoded local metadata 1008. The one or more input m-arrays may be m-arrays such as position m-array 2702 and local metadata m-array 2704, which are both depicted in FIG. 27.

In accordance with embodiments of the invention, regardless of whether a region is embedded with local metadata, the regions may be encoded using a combined m-array, where the local-metadata m-array may be the same as the m-array that represents X,Y position information, and the metadata m-array may be shifted according to the value of the metadata. If a region is not embedded with local metadata, 0 may be chosen as the value of its local metadata, i.e., the metadata m-array is not shifted. Therefore, 0 is not used as the value of local metadata in regions that are selected to embed local metadata.

Figure 27:
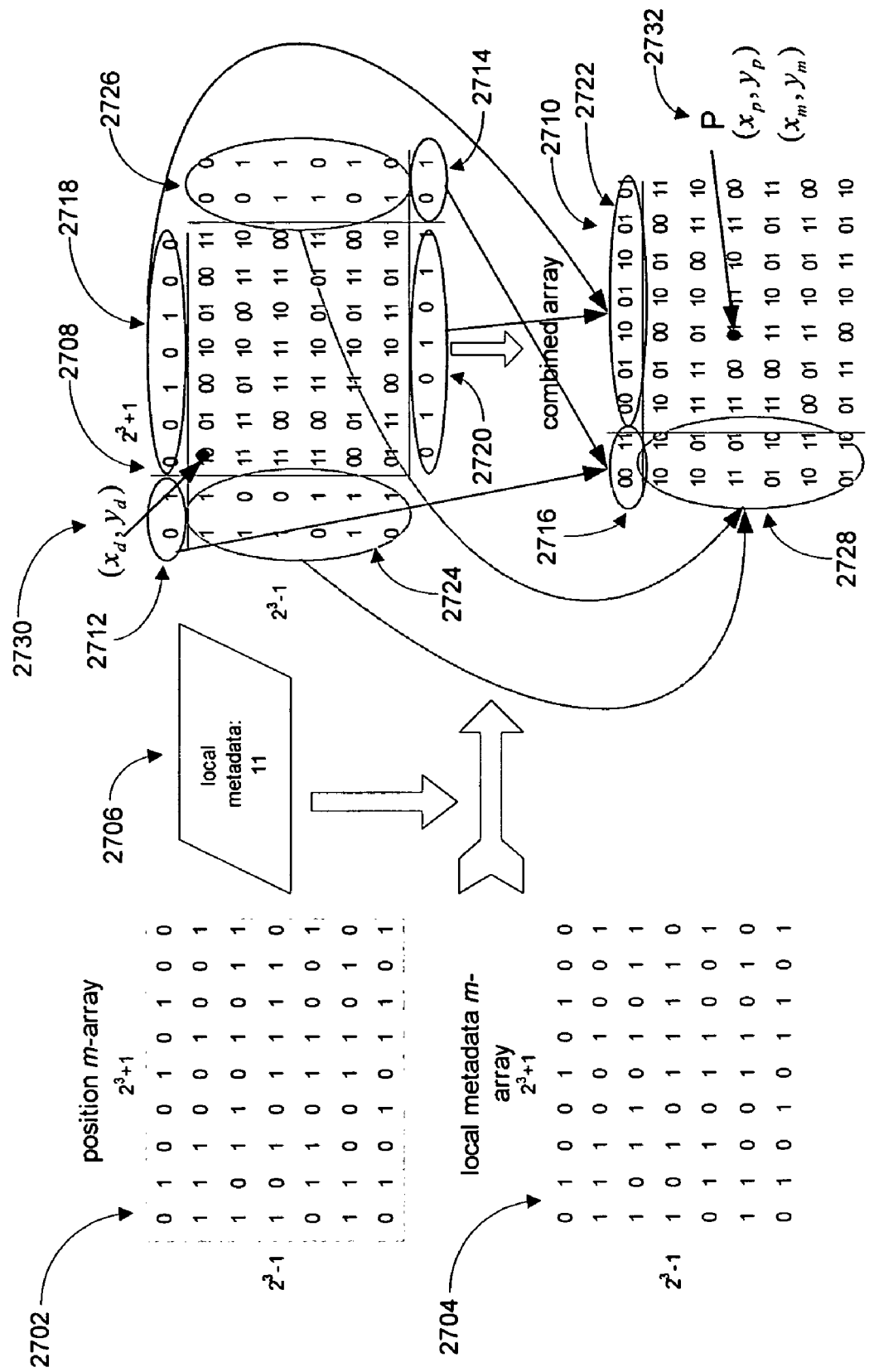
FIG. 27 shows a local-metadata-encoding example in accordance with embodiments of the invention.

FIG. 27 shows a local-metadata-encoding example in accordance with embodiments of the invention. Two identical m-arrays, a position m-array 2702 and a local metadata m-array 2704, are shown on the left side of FIG. 27. Both m-arrays are order 6 m-arrays. Therefore, the width of each m-array is $2^3+1$, and the height of each m-array is $2^3-1$. The position m-array and the local metadata m-array may contain repeating bit sequences that are the same length but that have different bit sequences than each other. Stated differently, different primitive polynomials of order n may be used to generate different m-arrays containing different repeating bit sequences.

Figure 24:
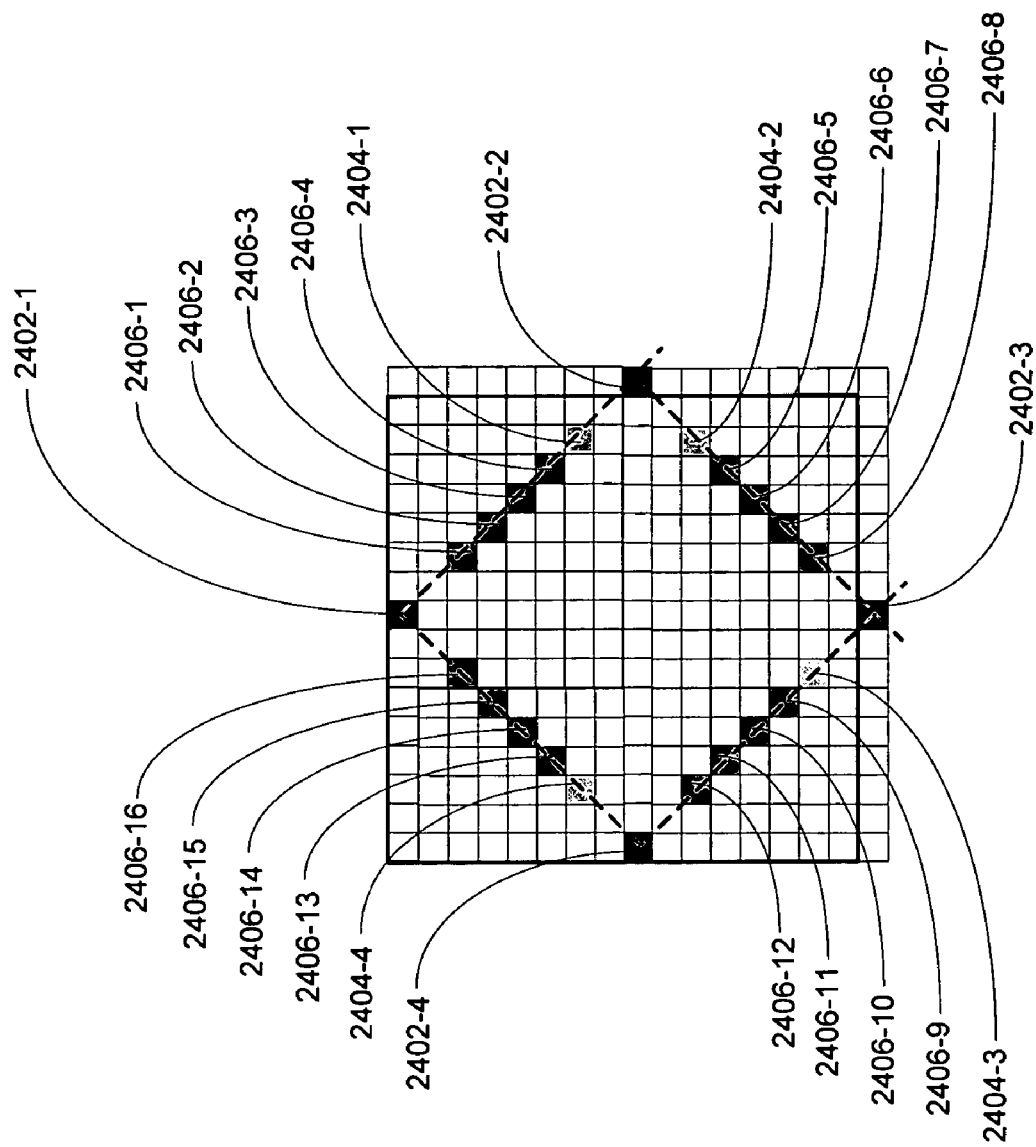
FIG. 24 shows an example embedded interaction code (EIC) symbol in accordance with embodiments of the invention.

The two m-arrays may be combined, in accordance with embodiments of the invention, to encode two bits in one EIC symbol. An example of an EIC symbol is depicted in FIG. 24. The EIC symbol in FIG. 24 occupies all of the rows and columns of grid spaces shown in FIG. 24 except for the bottom row and the right-most column. That row and that column belong to adjacent EIC symbols. Accordingly, while black dots 2402-1 and 2402-4 belong to the EIC symbol shown in FIG. 24, black dots 2402-2 and 2402-3 are not part of that EIC symbol. Data dots 2406-1 through 2406-16 may be black or white for representing bits of information. Orientation dots 2404-1 through 2404-4 are always white to facilitate properly orienting camera-captured EIC-symbol images.

When the position m-array 2702 and the local metadata m-array 2704 are combined, based on the value of the local metadata (e.g., 11), the start of the local metadata m-array 2704 is shifted to position $(x_d, y_d)$, as depicted at 2730 in FIG. 27, of the position m-array 2702. The x,y coordinates may be calculated as follows:

$$x_d = mod(\text{local metadata}, 2^{\frac{n}{2}} + 1),$$

$$y_d = int\left(\frac{\text{local metadata}}{2^{\frac{n}{2}} + 1}\right),$$

where n is the order of the m-array and $0 \leq \text{local metadata} \leq 2^n - 2$.

In FIG. 27, the value of the local metadata 2706 being encoded is 11 and the order of the m-arrays is 6 (i.e., n=6). Therefore, $$x_d = mod\left(11, 2^{\frac{6}{2}} + 1\right) = 2,$$

$$y_d = int\left(\frac{11}{2^{\frac{6}{2}} + 1}\right) = 1.$$

As shown in the partially combined m-array 2708, the local metadata m-array 2704 starts at position (2, 1) of the position m-array 2702. Since the position m-array 2702 and the local metadata m-array 2704 repeat themselves, a combined m-array with encoded local metadata 2710, which is shown in the lower right corner of FIG. 14, may be generated. As a result of starting the local metadata m-array 2704 at (2,1), portions 2720, 2714, and 2726 of the local metadata m-array 2704 are left over after combining the overlapping rows and columns of the position m-array 2702 and the local metadata m-array 2704. Portion 2726 of the local metadata m-array 2704 and portion 2724 of the position m-array 2702 are combined in the combined array 2710, as depicted at 2728. Similarly, portion 2714 of the local metadata m-array 2704 and portion 2712 of the position m-array 2702 are combined in the combined array 2710 as depicted at 2716. And portion 2720 of the local metadata m-array 2704 and portion 2718 of the position m-array 2702 are combined in the combined array 2710 as depicted at 2722.

The value of the metadata is the distance in the combined array between the position m-array 2702 and the local metadata m-array 2704. The distance is kept the same in every pair of bits in the combined array 2710. Therefore, if the position of each bit in its corresponding m-array is obtained, the distance in the combined array 2710 can be determined.

Local Metadata Decoding

FIG. 26 shows a flow diagram of a system for decoding local metadata in accordance with embodiments of the invention. A combined array with encoded local metadata 1008 is input to a local-metadata-decoding module 2602, which outputs decoded local metadata 2604.

To decode local metadata, the m-arrays that have been combined to form the combined array 1008 are each separately decoded. For example, referring to the example shown in FIG. 27, the position m-array 2702 and the local metadata m-array 2704 are separately decoded. Then, for a particular point P 2732, two positions are obtained: $(x_p, y_p)$, the position of the point in the position m-array 2702, and $(x_m, y_m)$, the position of the point in the local metadata m-array 2704.

The value of the local metadata may then be calculated as follows:

$$\text{local metadata} = mod(y_p - y_m, 2^{\frac{n}{2}} - 1) \cdot (2^{\frac{n}{2}} + 1) + mod(x_p - x_m, 2^{\frac{n}{2}} + 1),$$

where n is the order of the combined m-array 1008.

In the example shown in FIG. 27, the position of P in the first m-array is (4,3). The position of P in the second m-array is (2,2). Therefore, the value of metadata is:

local metadata=mod(3−2,2³−1)·(2³+1)+mod(4−2,2³+1)=11.

Metadata Solutions

In accordance with embodiments of the invention, local metadata may be embedded via multiple independent channels. For example, an EIC local metadata embedding solution for resolving local metadata conflicts, in accordance with embodiments of the invention may be based on 8-bit embedded interaction code (EIC) symbol (such as EF-diamond-8bit-a-16 and EF-diamond-8bit-i-14). As previously discussed, an example of an 8-bit EIC symbol is shown in FIG. 24.

A potential metadata allocation method for an 8-dimension EIC symbol is 1:6:1 (1:1:1:1:1:1:1:1)—one share is used for position, six shares are used for global metadata and one share is used for local metadata. And each of 8 shares constructs a physical data channel, which are each of order 28 respectively in the example (i.e., the width of each m-array used to encode each share is $2^{14}+1$, and the height of each m-array used to encode each share is $2^{14}-1$).

A metadata allocation method in accordance with embodiments of the invention allocates 8 local-metadata shares as follows: 1:5:0.5:0.5:0.5:0.5, in which 1 share of order 28 is used for position, five shares of order 28 for each whole share are used for global metadata, and four 0.5 shares (also referred to as half shares) of order 14 for each 0.5 share are used for four independent local metadata values. Due to this bit-proportion change, an m-array of order 14 may be used in each 0.5 share data channel to construct the EIC array.

FIGS. 14A-14E show a local-metadata encoding technique for avoiding local metadata conflicts in accordance with embodiments of the invention.

Figure 15:
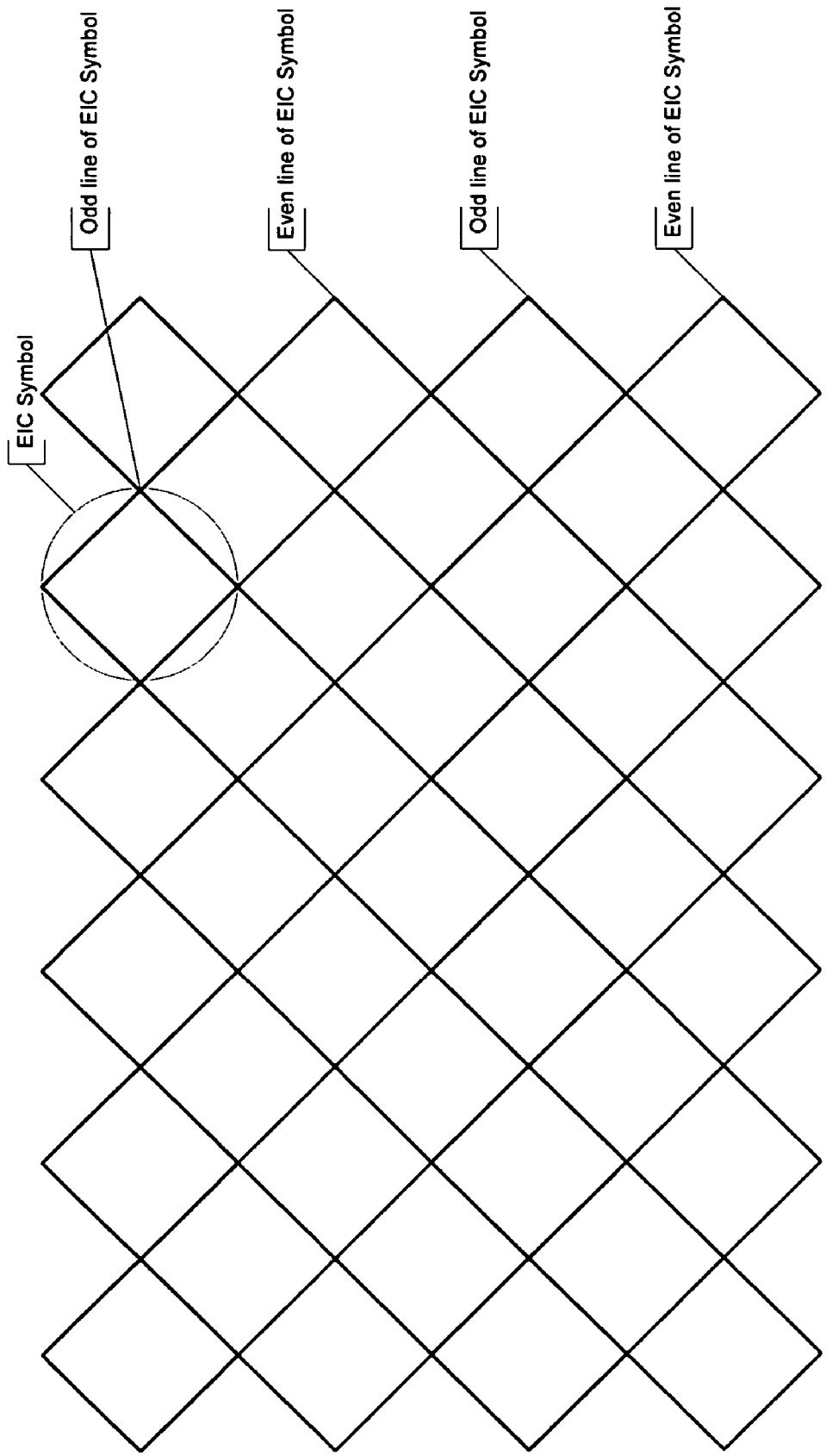

An independent local metadata channel with 0.5 shares may be implemented in accordance with embodiments of the invention as follows. FIG. 15 shows two 0.5 shares sharing one bit of an 8-bit EIC symbol, which means that odd lines of symbols are used to represent bits of one 0.5 share and even lines of symbols are used to represent the bits of the other 0.5 share. Decoding the captured image produces four independent local metadata values in accordance with embodiments of the invention.

Figure 14B:
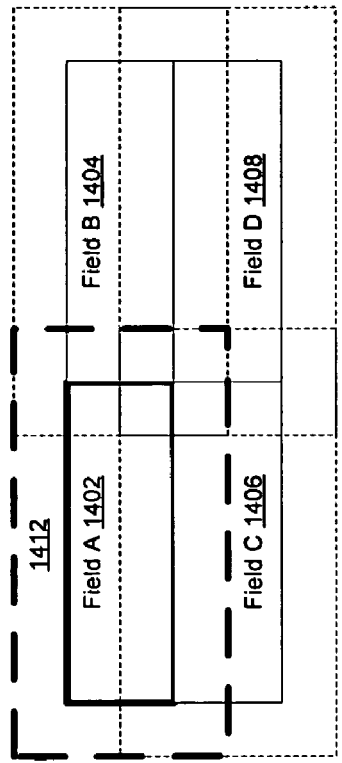
FIGS. 14-23 show techniques for storing and decoding metadata in accordance with aspects of the present invention.
Figure 14A:
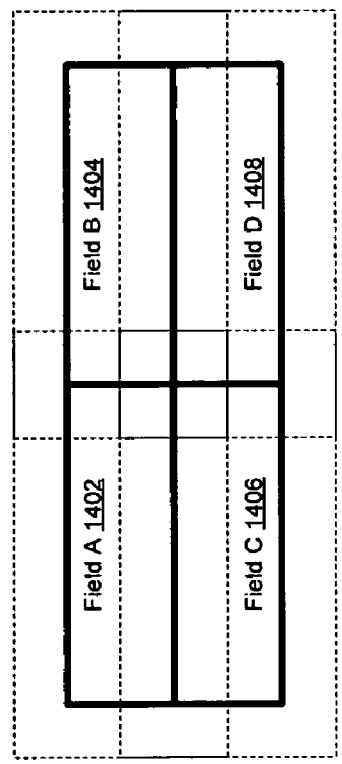
Figure 14D:
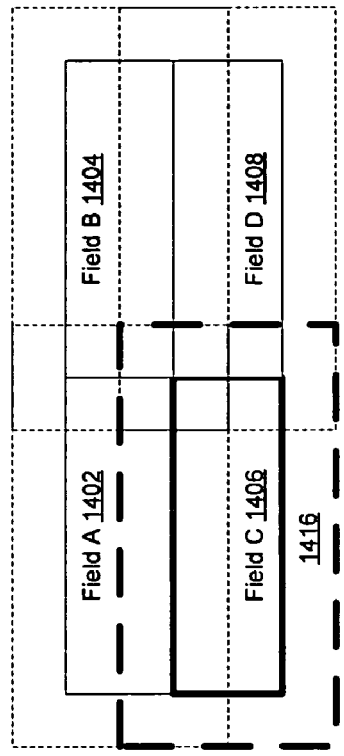
Figure 14C:
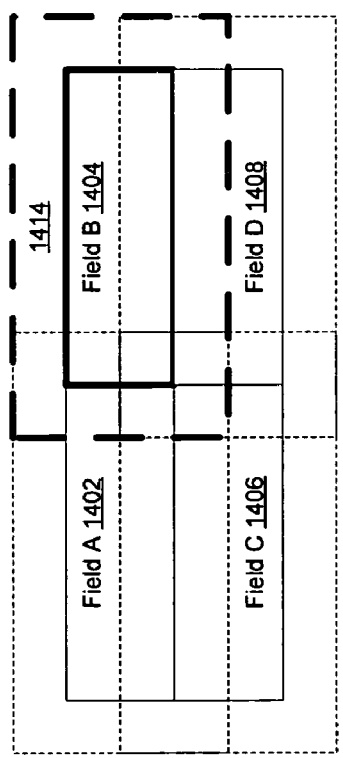
Figure 14E:
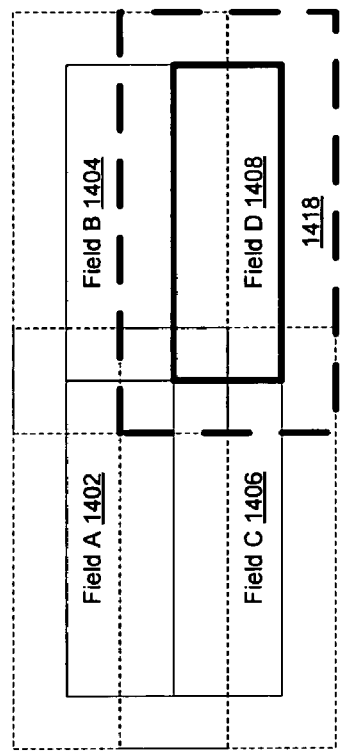

Now that four independent local metadata values are available, each of four potentially conflicting local metadata fields, namely, Field A 1402, Field B 1404, Field C 1406, and Field D 1408, may be assigned a respective local metadata channel, as shown in FIG. 14A. The boundary lines of Fields A, B, C, and D are emphasized in FIG. 14A by being drawn with thick lines. FIGS. 14B through 14E together show potential conflict areas 1412, 1414, 1416, and 1418 associated with Fields A, B, C, and D, respectively. Field A potentially conflicts with Fields B, C, and D in the areas where Field A's potential conflict area 1412 overlaps with Field B's potential conflict area 1414, Field C's potential conflict area 1416, and Field D's potential conflict area 1418, respectively.

Similarly, Field B potentially conflicts with Fields C and D in the areas where Field B's potential conflict area 1414 overlaps with Field C's potential conflict area 1416 and Field D's potential conflict area 1418, respectively. And Field C potentially conflicts with Field D in the area where Field C's potential conflict area 1416 overlaps with Field D's potential conflict area 1418.

FIG. 15 shows an example of how the bits of two 0.5 shares may share one bit of an EIC symbol for embedding local metadata in potentially conflicting regions and decoding the local metadata from such regions.

Figure 25:
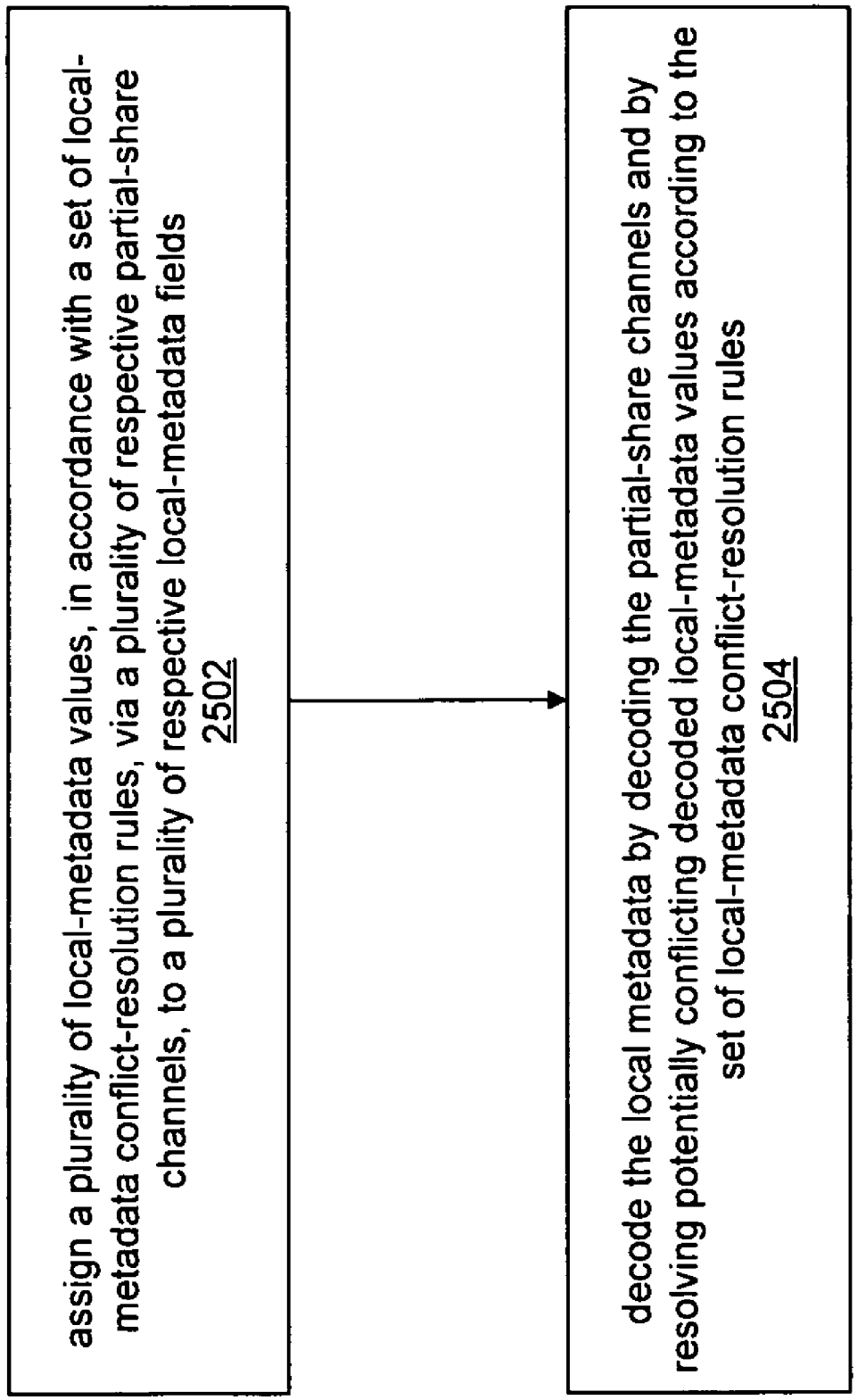
FIG. 25 shows steps in accordance with embodiments of the invention for embedding local metadata into, and extracting the local metadata from, an embedded interaction code document.

FIG. 25 shows steps in accordance with embodiments of the invention for embedding local metadata into, and extracting the local metadata from, an embedded interaction code document. A plurality of local-metadata values are assigned, in accordance with a set of local-metadata conflict-resolution rules, via a plurality of respective partial-share channels to a plurality of respective local-metadata fields, as shown at 2502. The local metadata is decoded by decoding the partial-share channels and by resolving potentially conflicting decoded local-metadata values according to the set of local-metadata conflict-resolution rules, as shown at 2504.

Various considerations and/or rules (also referred to as a set of local-metadata conflict-resolution rules) may be applied when embedding and decoding local metadata in potentially conflicting regions. For example:

Suppose that no more than 2 regions may be in conflict horizontally and that no more than 2 regions may be in conflict in vertically anywhere within a document.

When conflict regions occur, a local metadata value of a region to the left should be smaller than a local metadata value of a region to the right, and the values should not be continuous. The priority of this rule is higher than the priority of the following rule (i.e., the rules in this bullet point take precedence over the rules in the following bullet point).

When conflict regions occur, a local metadata value of an upper region should be smaller than a local metadata value of lower region, and the values should be continuous.

Figure 16:
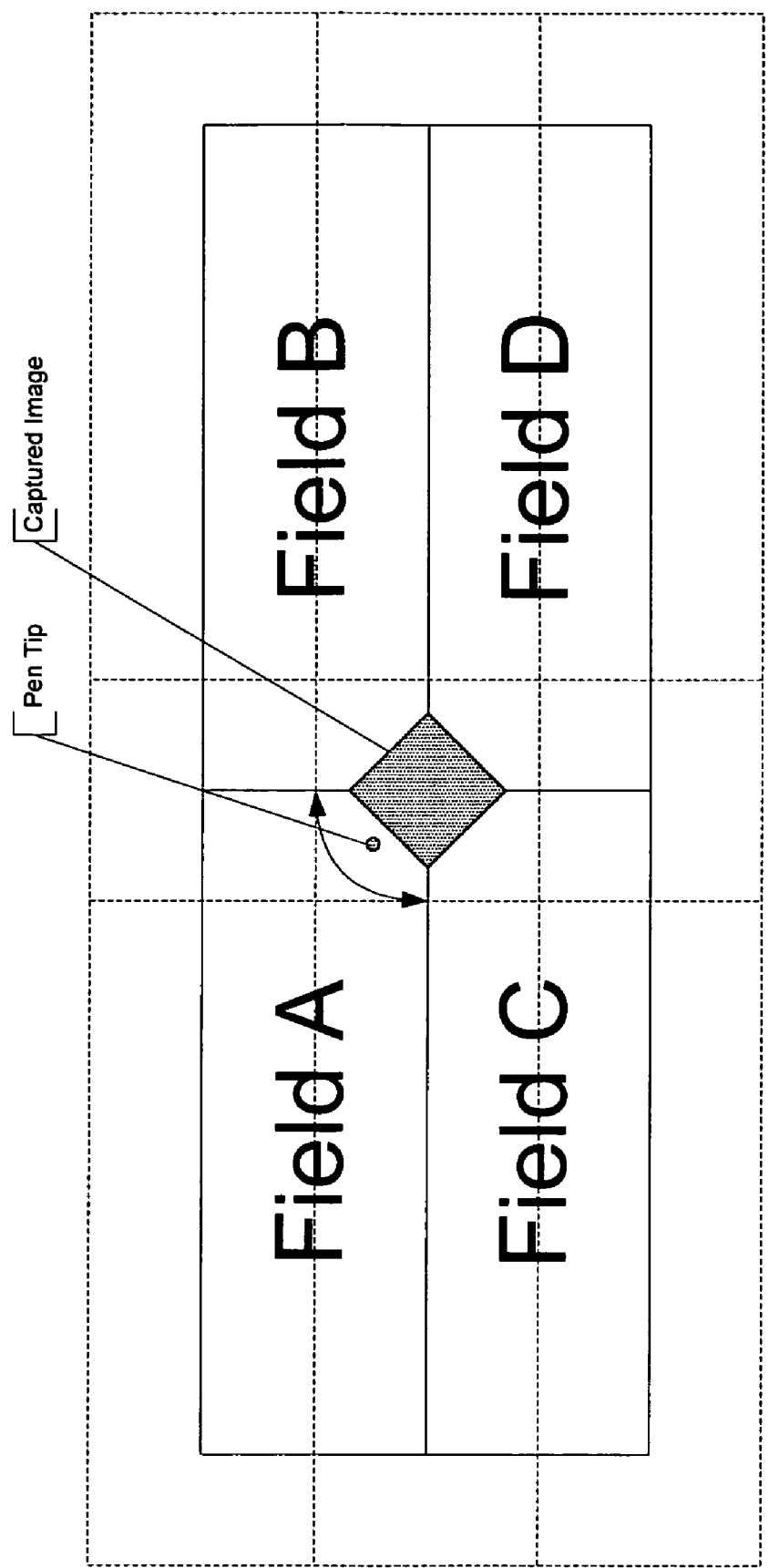
Figure 17:
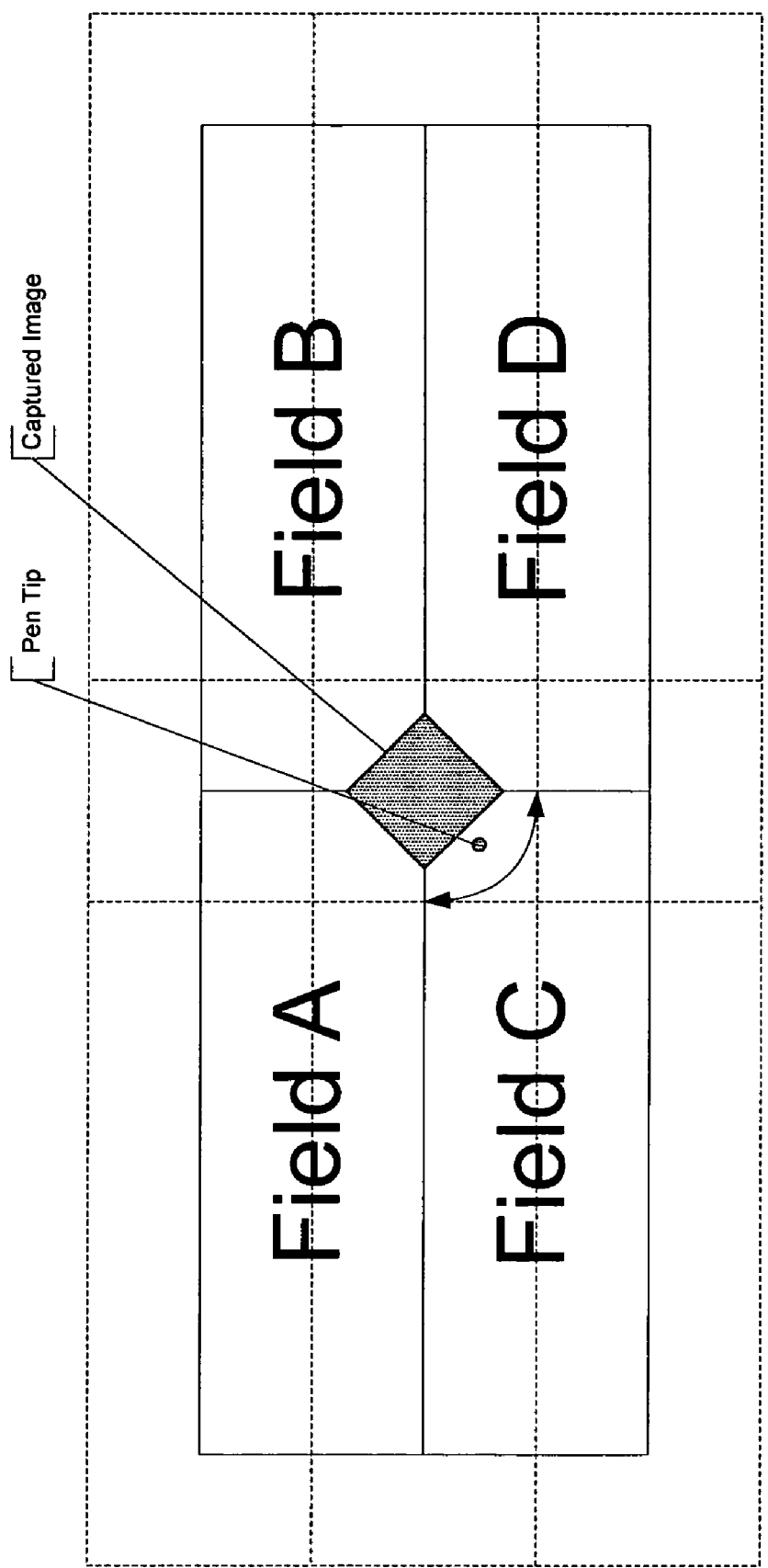
Figure 18:
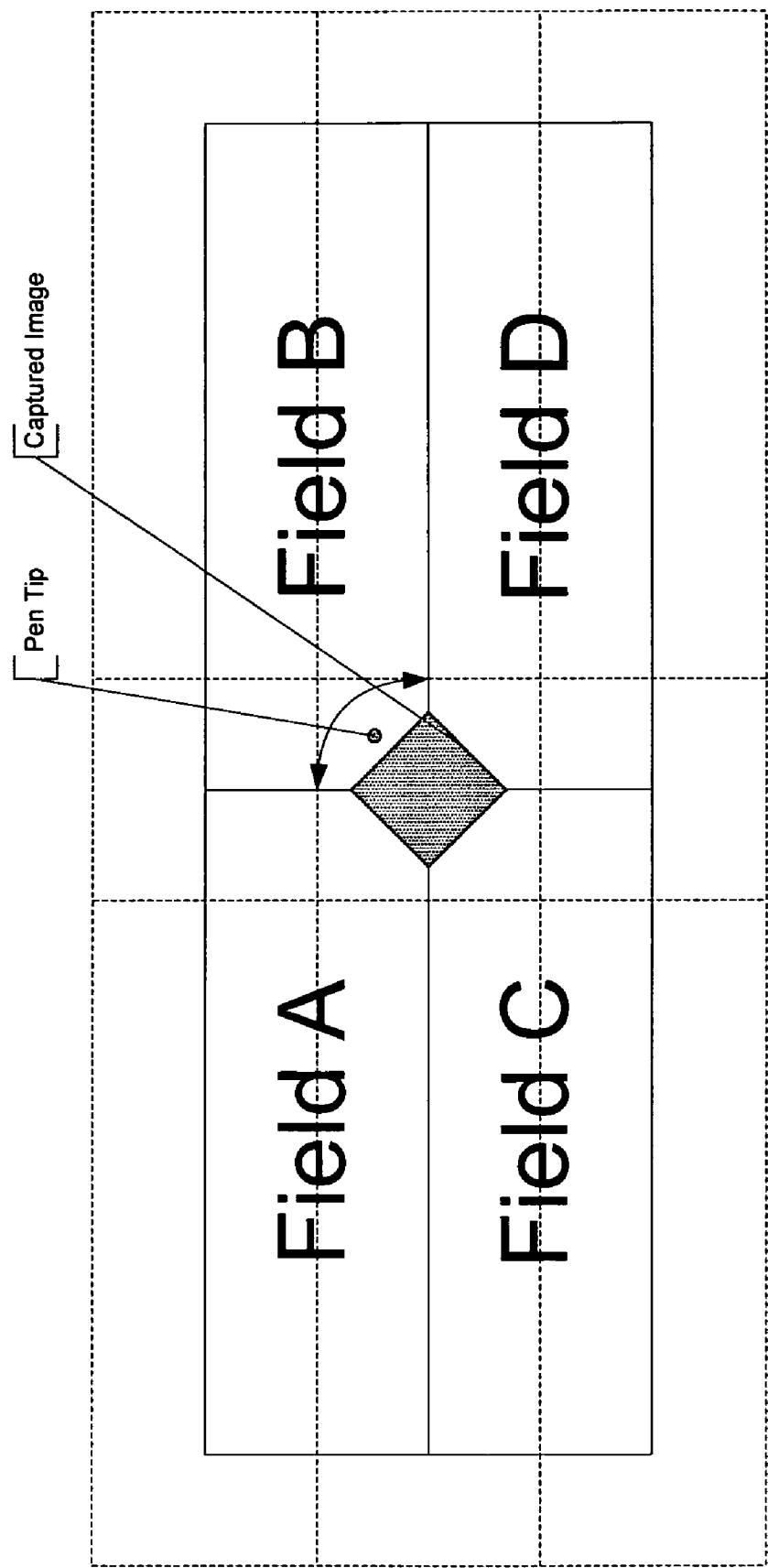
Figure 19:
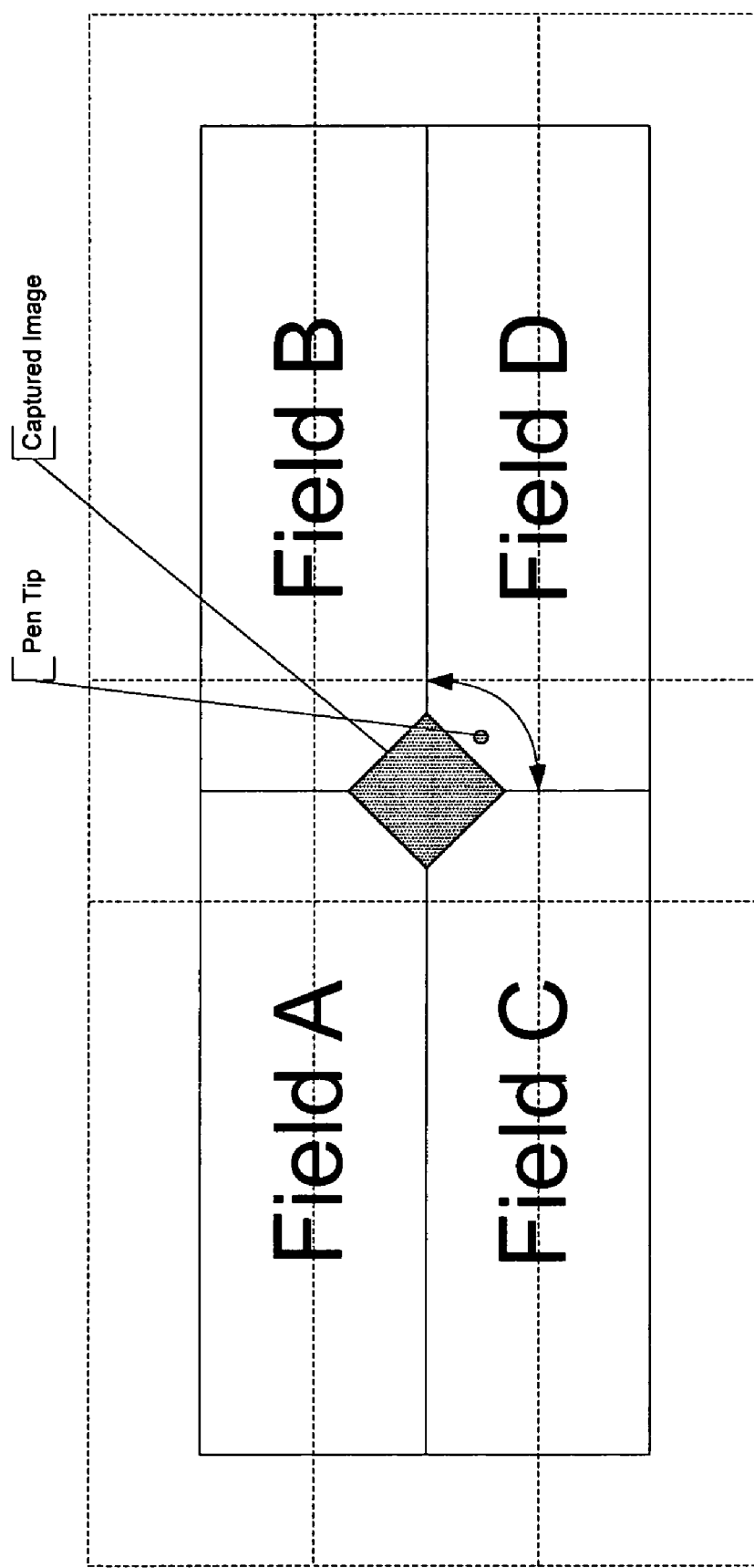

After decoding the pen-tip position and the local metadata, a local metadata conflict may occur, which means that there are multiple potential local metadata results for one captured image. Then, some considerations/rules may be applied for resolving potential conflicts regarding the local metadata decoding result. These considerations may include:

If four non-zero local metadata values are decoded at substantially the same time:
- As FIG. 16 shows, if the pen-tip position is above and to the left of the center of the captured image, then the smallest decoded metadata value is the correct (also referred to as the conflict-resolved) local metadata result.
- As FIG. 17 shows, if the pen-tip position is below and to the left of the center of the captured image, then the second smallest (i.e., third largest) decoded metadata value is the correct local metadata result.
- As FIG. 18 shows, if the pen-tip position is above and to the right of the center of the captured image, then the second largest (i.e., third smallest) decoded metadata value is the correct local metadata result.
- As FIG. 19 shows, if the pen-tip position is below and to the right of the center of the captured image, then the largest decoded metadata value is the correct local metadata result.

Figure 20:
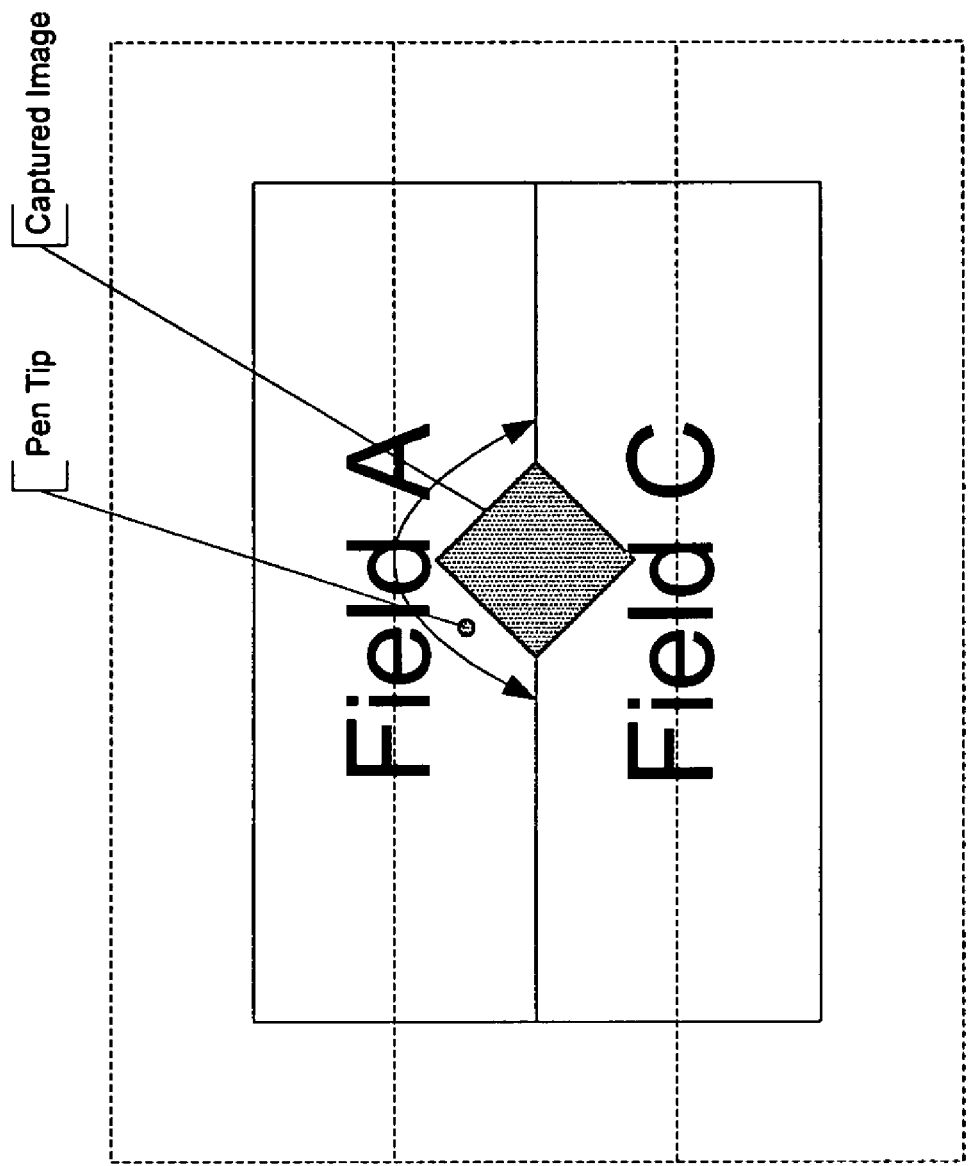
Figure 21:
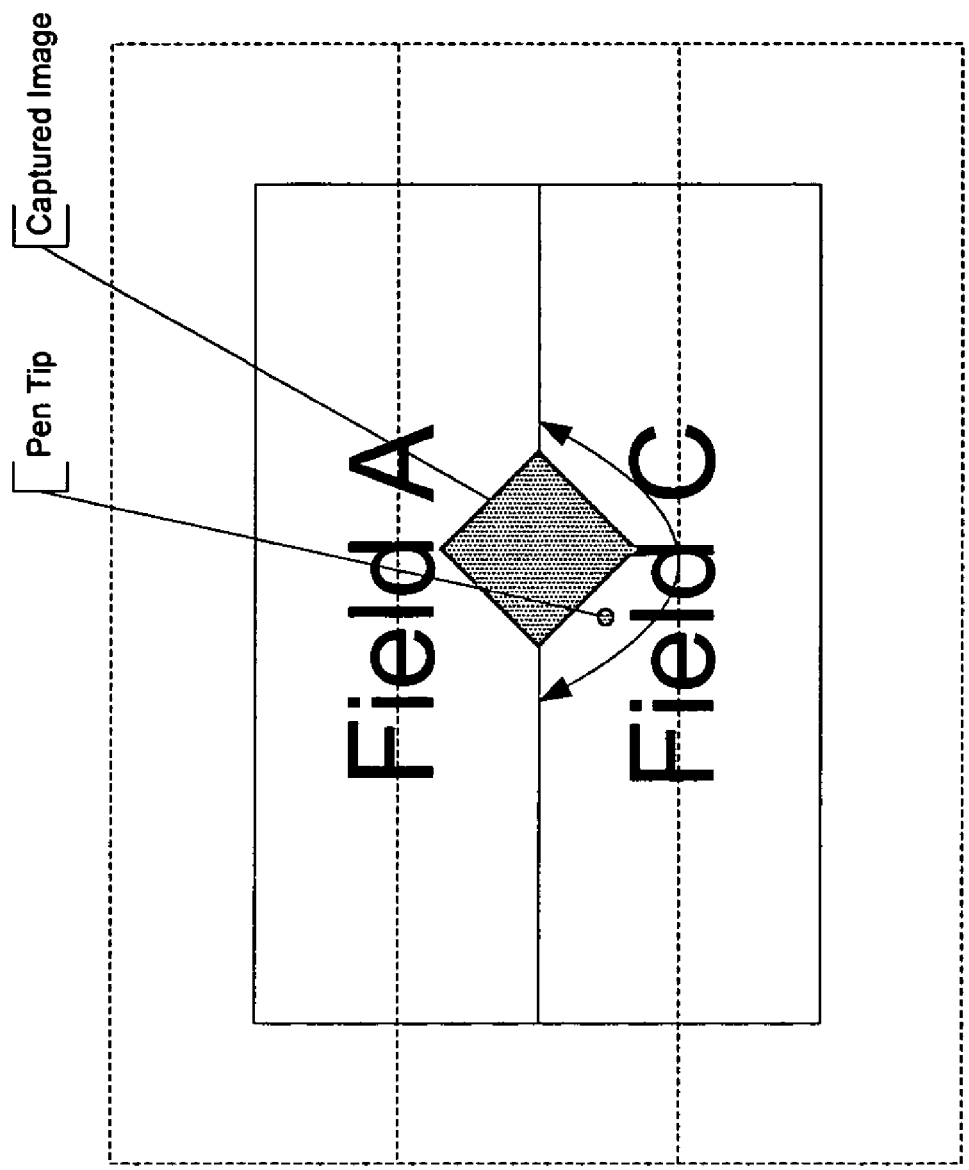

If two non-zero local metadata results with continuous values are decoded at substantially the same time:
- As FIG. 20 shows, if the pen-tip position is above the center of the captured image, then the smaller decoded metadata value is the correct local metadata result.
- As FIG. 21 shows, if the pen-tip position is below the center of the captured image, then the larger value is the correct local metadata result.

Figure 22:
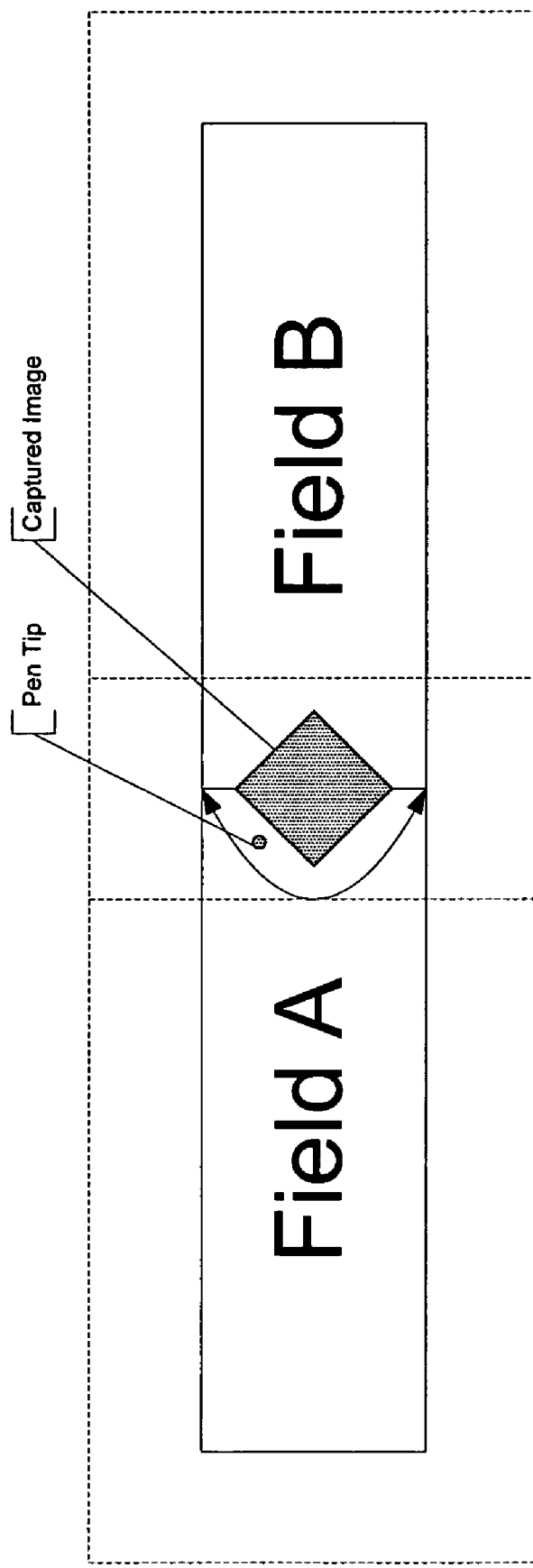
Figure 23:
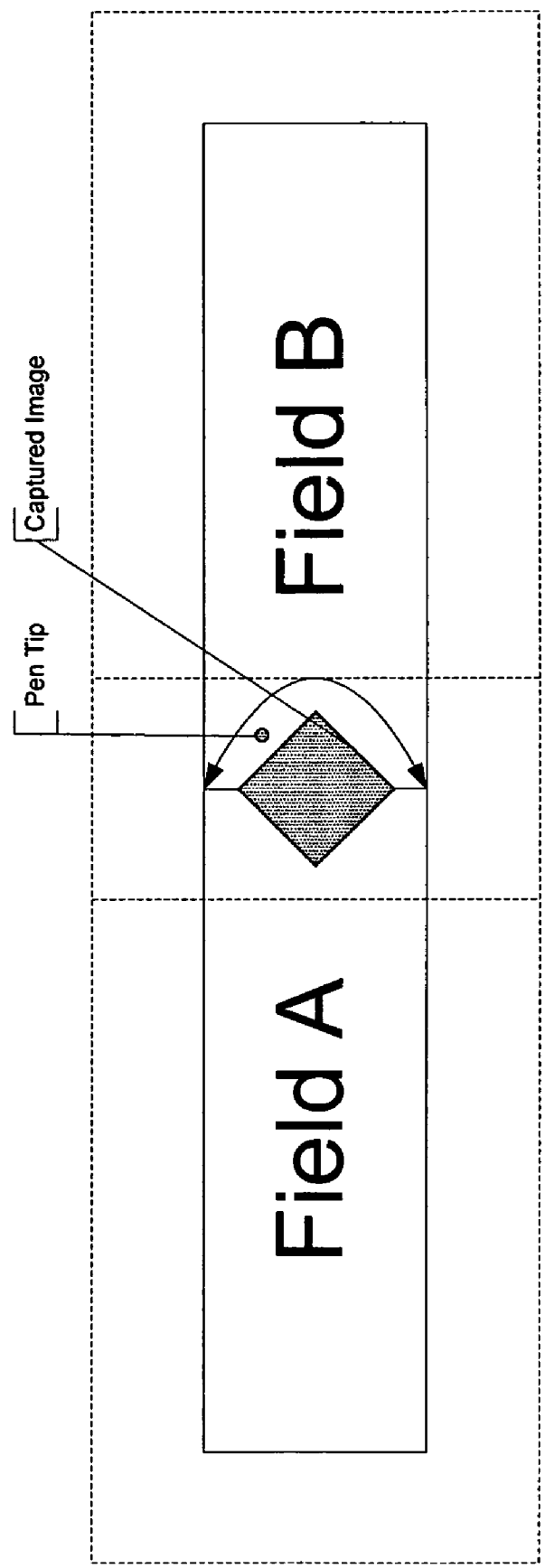

If two non-zero local metadata results with non-continuous values are decoded at substantially the same time:
- As FIG. 22 shows, if the pen-tip position is to the left of the center of the captured image, then the smaller decoded metadata value is the correct local metadata result.
- As FIG. 23 shows, if the pen-tip position is to the right of the center of the captured image, then the larger decoded metadata value is the correct local metadata result.

Certain regions of a document may have no local metadata conflict. For instance, suppose that c=1023 values of each independent local metadata channel are reserved for allocating local metadata values to conflict regions in a single document. Therefore, for each of four local metadata channels, there are $l=(2^{14}-1)-c$ values that can be used for conflict-free regions. These four 0.5 shares may be unified and allocated together. The number of unique local metadata values available for conflict-free regions may be expressed as $L=l^4$. Then the range of L is $c \leq L < (l^4+c)$, and local-metadata values within this range may be allocated to conflict free regions.

In the preceding example, the local metadata address space L is larger then 55 bits—approximately 55.6 bit, but less than the optimization maximum 4×14=56 bits, which means that no more than a reasonable address space is used for addressing the situation in which up to four local metadata regions have potential conflict areas that overlap.

A local metadata embedding solution in accordance with embodiments of the invention is extensible such that other types of conflicts may also be resolved. The discussion above relates to a single case of an EIC-array solution, and there are more extensible designs of EIC arrays behind the EIC-array solution discussed above. For example, to resolve potential conflicts of three overlapped enlarged regions in the horizontal and/or the vertical directions, the bits in the EIC array may be allocated in 1:5:0.33:0.33:0.33:0.33:0.33:0.33 proportion. Then, rules, which are similar to those discussed above, may be applied when embedding and decoding the local metadata. Accordingly, various types of partial shares, such as half shares, one-third shares, one-fourth shares, and the like, may be used in accordance with embodiments of the invention.

Universal local metadata, which is local metadata reserved by application or system, may be used in various documents and forms in accordance with embodiments of the invention. For a particular system, such as a university's files for a particular student, the student information will occur in various documents and/or forms and their various versions. Substantially all of the forms' fields that have the same information, such as student name, ID, and major, may be assigned a common local metadata value. The values assigned to information fields of this type may be synchronized with the university's student-information database.

Local-metadata embedding and decoding techniques in accordance with embodiments of the invention may support use of local metadata as described above as follows. When a local-metadata-decoding conflict occurs, a mapping table may be built from conflict-reserved local metadata to unique local metadata. The mapping table may be saved with the EIC document, and a copy of the mapping table may be saved by an image-capturing pen so that the local-metadata-decoding conflict may be efficiently resolved while the image-capturing pen is being used for interacting with the EIC document.

Although the invention has been defined using the appended claims, these claims are illustrative in that the invention is intended to include the elements and steps described herein in any combination or sub combination. Accordingly, there is any number of alternative combinations for defining the invention, which combinations incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of embodiments of the invention contained herein covers all such modifications and alterations.

We claim:

1. A method performed by a computer having a memory and a processor for decoding local metadata from an embedded interaction code surface comprising:

assigning, in accordance with a set of local metadata conflict-resolution rules, a first local metadata value to a first local metadata field, the first local metadata field being associated with a first plurality of embedded interaction code symbols, each embedded interaction code symbol including a plurality of dots;

assigning, in accordance with the set of local metadata conflict-resolution rules, a local metadata value to a second local metadata field, the second local metadata field being associated with a second plurality of embedded interaction code symbols, each embedded interaction code symbol including a plurality of dots;

embedding the first local metadata field and the second local metadata field into the embedded interaction code surface, wherein the first local metadata field and the second local metadata field are coterminous such that at least one of the first plurality of associated embedded interaction code symbols and at least one of the second plurality of associated embedded interaction code symbols have a dot in common;

capturing an image of a portion of the embedded interaction code surface, the image including embedded position information and local metadata;

identifying by the processor the first local metadata field and the second local metadata field from the captured image;

decoding a first local metadata value from the first local metadata field;

decoding a second local metadata value from the second local metadata field; and selecting, in accordance with the set of local metadata conflict-resolution rules, a conflict-resolved local metadata results, the set of local metadata conflict-resolution rules comprising one or more rules selected from the group consisting of:

when two continuous local metadata values have been decoded from the embedded interaction code surface, when a pen-tip position is above the center of the captured image, selecting the smaller decoded local metadata value of the two continuous local metadata values as the conflict-resolved decoded local metadata result, when two continuous local metadata values have been decoded from the embedded interaction code surface, when a pen-tip position is below the center of the captured image, selecting the larger decoded local metadata value of the two continuous local metadata values as the conflict-resolved decoded local metadata result, when two non-continuous local metadata values have been decoded from the embedded interaction code surface, when a pen-tip position is to the left of the center of the captured image, selecting the smaller decoded local metadata value of the two non-continuous local metadata values as the conflict-resolved decoded local metadata result, and when two non-continuous local metadata values have been decoded from the embedded interaction code surface, when a pen-tip position is to the right of the center of the captured image, selecting the larger decoded local metadata value of the two non-continuous local metadata values as the conflict-resolved decoded local metadata result.

2. A method performed by a computer having a memory and a processor for decoding local metadata from an embedded interaction code surface comprising:

assigning, in accordance with a set of local metadata conflict-resolution rules, four local metadata values to four local metadata fields, the local metadata fields being associated with embedded interaction code symbols, each embedded interaction code symbol including a plurality of dots;

embedding the four local metadata fields into the embedded interaction code surface, wherein the local metadata fields are coterminous such that at least one of the associated embedded interaction code symbols associated with a local metadata field and at least one of the associated embedded interaction code symbols associated with another local metadata field have a dot in common;

capturing an image of a portion of the embedded interaction code surface, the image including embedded position information and local metadata;

with the processor, identifying a first local metadata field and a second local metadata field from the captured image;

decoding four local metadata values from the four local metadata fields; and selecting, in accordance with a set of local metadata conflict-resolution rules, a conflict-resolved local metadata result, the set of local metadata conflict-resolution rules comprising one or more rules selected from the group consisting of:

when a pen-tip position is above and to the left of the center of the captured image, selecting the smallest decoded local metadata value of the four local metadata values as the conflict-resolved decoded local metadata result, when a pen-tip position is above and to the left of the center of the captured image, selecting the smallest decoded local metadata value of the four local metadata values as the conflict-resolved decoded local metadata result, when a pen-tip position is below and to the left of the center of the captured image, selecting the second smallest decoded local metadata value of the four local metadata values as the conflict-resolved decoded local metadata result, when a pen-tip position is above and to the right of the center of the captured image, selecting the second lamest decoded local metadata value of the four local metadata values as the conflict-resolved decoded local metadata result, and when a pen-tip position is below and to the right of the center of the captured image, selecting the lamest decoded local metadata value of the four local metadata values as the conflict-resolved decoded local metadata result.

3. A computer-readable storage medium containing computer-executable instructions for embedding local metadata into, and extracting the local metadata from, an embedded interaction code document by performing steps comprising:

assigning, in accordance with a set of local metadata conflict-resolution rules, a first local metadata value to a first local metadata field, the first local metadata field being associated with a first plurality of embedded interaction code symbols;

assigning, in accordance with the set of local metadata conflict-resolution rules, a local metadata value to a second local metadata field, the second local metadata field being associated with a second plurality of embedded interaction code symbols;

embedding the first local metadata field and the second local metadata field into the embedded interaction code document, wherein the first local metadata field and the second local metadata field at least partially overlap such that at least one of the first plurality of embedded interaction code symbols and at least one of the second plurality of embedded interaction code symbols have at least one point in common;

capturing an image of the embedded interaction code document, the captured image including a portion of the first local metadata field and a portion of the second local metadata field;

decoding the local metadata values assigned to the first local metadata field and the second local metadata field; and resolving potentially conflicting decoded local metadata values according to the set of local metadata conflict-resolution rules, the set of local metadata conflict-resolution rules that apply when four local metadata values have been decoded comprising one or more rules selected from the group consisting of:

when a pen-tip position is above and to the left of a center of the captured image, then the smallest decoded local metadata value of the four local metadata values is selected as the conflict-resolved decoded local metadata result, when a pen-tip position is below and to the left of a center of the captured image, then the second smallest decoded local metadata value of the four local metadata values is selected as the conflict-resolved decoded local metadata result, when a pen-tip position is above and to the right of a center of the captured image, then the second lamest decoded local metadata value, of the four local metadata values is selected as a conflict-resolved decoded local metadata result, and when a pen-tip position is below and to the right of a center of the captured image, then the largest decoded local metadata value of the four local metadata values is selected as the conflict-resolved decoded local metadata result.

4. The computer-readable storage medium of claim 3, wherein:

when the first local metadata field is located to the left of the second local metadata field, the first local metadata value is less than the second local metadata value and the first local metadata value and the second local metadata value are non-continuous;

when a third local metadata field is located above a fourth local metadata field, the third local metadata value is less than the fourth local metadata value and the third local metadata value and the fourth local metadata value are continuous; and the rules that pertain to the first and second local metadata fields take precedence over the rules that pertain to the third and fourth local metadata fields.

5. The computer-readable storage medium of claim 3, wherein:

when two continuous local metadata values have been decoded and a pen-tip position is above a center of the captured image, then the smaller decoded local metadata value of the two continuous local metadata values is selected as a conflict-resolved decoded local metadata result; and when two continuous local metadata values have been decoded and a pen-tip position is below a center of the captured image, then the larger decoded local metadata value of the two continuous local metadata values is selected as a conflict-resolved decoded local metadata result.

6. The computer-readable storage medium of claim 5, wherein:

when two non-continuous local metadata values have been decoded and a pen-tip position is to the left of a center of the captured image, then the smaller decoded local metadata value of the two non-continuous local metadata values is selected as a conflict-resolved decoded local metadata result; and when two non-continuous local metadata values have been decoded and a pen-tip position is to the right of a center of the captured image, then the larger decoded local metadata value of the two non-continuous local metadata values is selected as a conflict-resolved decoded local metadata result.

* * * * *